US011302134B2

(12) United States Patent
Uemizo et al.

(10) Patent No.: US 11,302,134 B2
(45) Date of Patent: Apr. 12, 2022

(54) AUTOMATIC BILL HANDLING SYSTEM

(71) Applicant: Japan Cash Machine Co., Ltd., Osaka (JP)

(72) Inventors: Yoshiaki Uemizo, Osaka (JP); Takashi Ueda, Osaka (JP)

(73) Assignee: Japan Cash Machine Co., Ltd., Osaka (JP)

(*) Notice: Subject to any disclaimer, the term of this patent is extended or adjusted under 35 U.S.C. 154(b) by 302 days.

(21) Appl. No.: 16/719,249

(22) Filed: Dec. 18, 2019

(65) Prior Publication Data

US 2021/0027566 A1    Jan. 28, 2021

(30) Foreign Application Priority Data

Jul. 23, 2019 (JP) .............. JP2019-135153
Jul. 23, 2019 (JP) .............. JP2019-135154
Jul. 23, 2019 (JP) .............. JP2019-135155
Jul. 23, 2019 (JP) .............. JP2019-135156
Jul. 23, 2019 (JP) .............. JP2019-135157

(51) Int. Cl.
*G07D 11/16* (2019.01)
*G07D 11/125* (2019.01)
*G07D 11/34* (2019.01)
*B65G 47/90* (2006.01)
*G07D 11/23* (2019.01)

(52) U.S. Cl.
CPC .......... *G07D 11/16* (2019.01); *B65G 47/90* (2013.01); *G07D 11/125* (2019.01); *G07D 11/23* (2019.01); *G07D 11/34* (2019.01); *G07D 2211/00* (2013.01)

(58) Field of Classification Search
CPC ...... G07D 11/16; G07D 11/125; G07D 11/23; G07D 11/34; G07D 2211/00; B65G 47/90
See application file for complete search history.

(56) References Cited

U.S. PATENT DOCUMENTS

| 5,105,069 | A | 4/1992 | Hakenewerth et al. |
| 5,183,999 | A | 2/1993 | Hakenewerth et al. |
| 9,315,343 | B1* | 4/2016 | Widder ............... B65G 59/023 |
| 10,755,522 | B1* | 8/2020 | Pechinko ............. G07G 1/0027 |
| 2004/0250766 | A1 | 12/2004 | Fink |
| 2011/0156416 | A1 | 6/2011 | Kawanami et al. |
| 2017/0173800 | A1 | 6/2017 | Genefke |
| 2017/0341131 | A1 | 11/2017 | Hayashi et al. |

(Continued)

FOREIGN PATENT DOCUMENTS

| CN | 106313014 A | 1/2017 |
| CN | 107381028 A | 11/2017 |

(Continued)

*Primary Examiner* — Sonji N Johnson
(74) *Attorney, Agent, or Firm* — FisherBroyles, LLP; Rob L. Phillips

(57) ABSTRACT

Disclosed herein are devices, systems, and methods for automatic handling of bank notes, gambling tickets, bills, or other types of paper notes. The disclosed devices, systems, and methods are directed to, or include, various robot arms, which may be articulated, that are configured to open a bill storage container, remove a bundle of bills, load the bundle on a bill conveying device, and load the bundle of bills in a bill storage case. The systems include one or more control devices to control the operations of the components that move the bill bundle.

7 Claims, 35 Drawing Sheets

(56) References Cited

U.S. PATENT DOCUMENTS

2018/0276933 A1    9/2018  Nakanishi et al.
2019/0108707 A1*   4/2019  Villiger ................ G07D 11/125

FOREIGN PATENT DOCUMENTS

| EP | 3664050 A1 | 10/2020 |
|---|---|---|
| JP | S3511882 Y | 6/1935 |
| JP | S5684922 U | 12/1979 |
| JP | 61169992 A | 7/1986 |
| JP | 61196396 A | 8/1986 |
| JP | 62092095 A | 4/1987 |
| JP | S62-092095 | 4/1987 |
| JP | 62162189 A | 7/1987 |
| JP | 62171818 A | 7/1987 |
| JP | 62239293 A | 10/1987 |
| JP | 62293396 A | 12/1987 |
| JP | H0283186 A | 3/1990 |
| JP | H02116490 A | 5/1990 |
| JP | H2111883 U | 9/1990 |
| JP | 200682946 A | 3/2006 |
| JP | 2006341361 A | 12/2006 |
| JP | 2007083331 A | 4/2007 |
| JP | 2008195501 A | 8/2008 |
| JP | 2010058978 A | 3/2010 |
| JP | 2011096128 A | 5/2011 |
| JP | 2011173635 A | 9/2011 |
| JP | 2014226759 A | 12/2014 |
| JP | 2016031619 | 3/2016 |
| JP | 2016031619 A | 3/2016 |
| JP | 2016124064 A | 7/2016 |
| JP | 2016224664 A | 12/2016 |
| JP | 2017210347 A | 11/2017 |
| WO | 2019026644 A1 | 2/2019 |

* cited by examiner

| TYPE ID OF CONTAINER | SIZE OF CONTAINER | POSITION OF KEY HOLE | ANGLE OF KEY HOLE | TYPE OF KEY |
|---|---|---|---|---|
| . | . | . | . | . |
| . | . | . | . | . |
| . | . | . | . | . |

FIG. 17B

| ID OF CONTAINER | TYPE ID OF CONTAINER | ID OF SET DEVICE | DATE AND TIME OF CORRECTION |
|---|---|---|---|
| . | . | . | . |
| . | . | . | . |
| . | . | . | . |

FIG. 17C

| ID OF KEY | COLLECTED VALUE FOR POSITION | COLLECTED VALUE FOR ANGLE | SIZE OF KEY |
|---|---|---|---|
| . | . | . | . |
| . | . | . | . |
| . | . | . | . |

FIG. 17D

AUTOMATIC BILL HANDLING SYSTEM

CROSS-REFERENCE TO RELATED APPLICATIONS

This application claims the benefit under 35 U.S.C. § 119(a) of: Japanese Patent Application No. 2019-135153, filed on Jul. 23, 2019; Japanese Patent Application No. 2019-135154, filed on Jul. 23, 2019; Japanese Patent Application No. 2019-135155, filed on Jul. 23, 2019; Japanese Patent Application No. 2019-135156, filed on Jul. 23, 2019; and Japanese Patent Application No. 2019-135157, filed on Jul. 23, 2019; which are incorporated by reference as if fully disclosed herein.

FIELD

The present disclosure relates to automatic bill handling devices and systems for conveying and/or organizing bills, bank notes, printed gaming tickets, and the like. Such automatic bill handling devices may include any of a box packing apparatus, a conveyance apparatus, and robot arms.

BACKGROUND

Some business establishments, such as casinos, have devices (such as gaming machines) that receive bank notes or other types of inserted printed records, such as gaming tickets. Hereinafter, such bank notes or printed records will be referred to as just "bills." The bills may be initially bundled or stacked inside devices, such as in secure boxes, for transport to another location for further operations, such as for sorting, counting, further packing, or other operations. Another such location is a counting/sorting room at a casino, in which secured boxes from a gaming floor are opened and the bills may be sorted, counted, and repackaged.

At the location for further operations, there is a need for safe and secure handling of the bills, or bundles thereof. For example, in counting rooms of casinos or other establishments, there may be a higher risk of theft or human error when processing a large number of bills, bank notes, or other printed or paper objects.

SUMMARY

This summary is provided to introduce a selection of concepts in a simplified form that is further described below in the Detailed Description section. This summary is not intended to identify key features or essential features of the claimed subject matter, nor is it intended to be used as an aid in determining the scope of the claimed subject matter.

In a first embodiment, an automatic bill handling system is described. The automatic bill handling system may include: a robot arm configured to extract bills from a bill storage container in which the bills are stored; and a bill conveying device configured to convey the bills extracted by the robot arm. The robot arm conveys the bills extracted from the bill storage container to the bill conveying device while maintaining a horizontal orientation of the bills extracted from the storage container. The bill conveying device may include a bill storage unit into which bills extracted by the robot arm are to be inserted, and a rail configured to linearly slide the bill storage unit in a direction away from the bill storage container. The bill conveying device conveys the bills in the posture that has been determined when the robot arm extracts the bills.

Another embodiment discloses an automatic bill handling system that includes: a box conveying device configured to convey a plurality of bill storage containers in which bills are stored; a first robot arm configured to unlock the bill storage containers using a key and open respective lids of the bill storage containers; a second robot arm configured to extract bills stored in the plurality of bill storage containers; a bill conveying device configured to convey the bills extracted by the second robot arm; a bill storage case configured to accumulate the bills extracted from the plurality of box storage containers; and a third robot arm configured to grasp bills conveyed by the bill conveying device and accumulate the bills in the bill storage case. In further embodiments, the automatic bill handling system may include a printer configured to print a respective sheet for identifying the bills of each bill storage container and a fourth robot arm configured, for each of the conveying devices, to place the respective sheet on the bills after being conveyed by the bill conveying device. The third robot arm is operable to grasp the bills with the respective sheet and accumulate the bills with the respective sheet in the bill storage case.

A third embodiment discloses an automatic bill handling method that includes the operations of: unlocking a bill storage container using a key with a first robot arm; opening a lid of the unlocked bill storage container with the first robot arm; extracting, using a second robot arm, bills stored in the bill storage container in a posture in which the lid of the bill storage container has been opened; conveying the extracted bills by a bill conveying device; grasping bills conveyed by the bill conveying device with a third robot arm; and accumulating the bills in a bill storage case.

A fourth embodiment discloses a case storage mechanism for packing a bill bundle in a bill storage case that includes: a mounting table on which the bill storage case can be mounted; a robot arm configured to grasp the bill bundle and pack the bill bundle into the bill storage case; and a suction mechanism configured to detach a front wall from the bill storage case mounted on the mounting table and restore the front wall to the bill storage case after the bill bundle has been packed into the bill storage case.

A fifth embodiment discloses a robot hand configured on a robot arm. The robot arm may have one or more articulated sections, and the robot hand may be a two-finger type. One finger may be a fixed finger, with another a movable finger so that the robot hand can grasp an object, such as bill bundle, between the two fingers. In variant embodiments, each finger may be configured with one or more elongated or rod-shaped members.

BRIEF DESCRIPTION OF THE DRAWINGS

The disclosure will be readily understood by the following detailed description in conjunction with the accompanying drawings, wherein like reference numerals designate like structural elements.

FIGS. 17B-17D show data types stored by a first control device.

Figure 1:
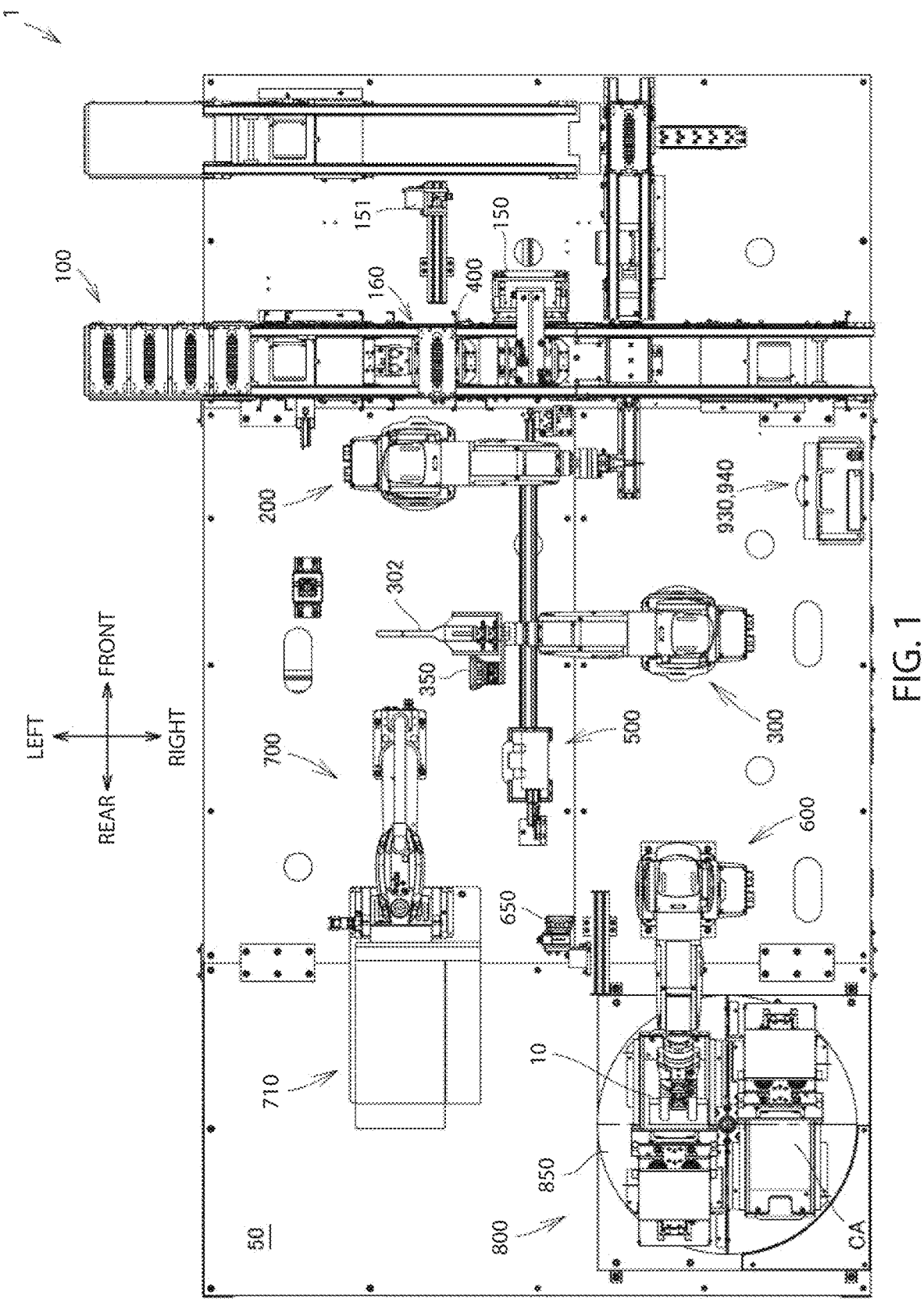
FIG. 1 shows a plan view of an automatic bill handling system, according to an embodiment.

As a convenience, a partial list of reference numbers and labels used in the drawings is provided here:

1 Automatic bill handling system.
10 Bill storage case.
11A . . . F Walls of the bill storage case.
12 Front wall unit (or "front wall portion") of the bill storage case.
50 Base of automatic bill handling system.
100 Box conveying device.
150 Box sensor.
151 Box image sensor.
160 Box reversing device.
200 First robot arm.
210 Key.
300 Second robot arm.
301a/b Articulated sections of the second robot arm.
302 Robot hand.
310 Movable finger.
311 Base portion of the movable finger.
312 Intermediate portion of the movable finger.
313 Claw portion of the movable finger.
315 Reinforcing plate of the movable finger.
320 Fixed finger.
321 Base portion of the fixed finger.
322 Intermediate portion of the fixed finger.
323 Claw portion of the fixed finger.
324 Protruding portion of the fixed finger.
325 Reinforcing plate of the fixed finger.
330 Movable finger of the lifting mechanism.
331 Support plate finger of the lifting mechanism.
332f Front lifting plate.
332r Rear lifting plate.
333f Front air cylinder mechanism.
333r Rear air cylinder mechanism.
335 First air supply/exhaust port.
336 Second air supply/exhaust port.
340 Connecting portion.
350 Second robot arm imaging unit.
400 Bill storage container.
411 Holding plate of the bill storage container.
412a/b Support bases of the bill storage container.
420 Front lid of the bill storage container.
500 Bill conveying device.
510 Storage unit of the bill conveying device.
511 Bottom surface of the storage unit.
511X First groove portion of the storage unit.
511Y Second groove portion of the storage unit.
512a . . . d Wall portions of the storage unit.
520 Slide portion of the storage unit.
530 Arranging mechanism of the storage unit.
600 Third robot arm.
610 Alternate robot hand of the third robot arm.
621 Movable finger of the third robot arm.
622 Fixed finger of the third robot arm.
623 Movable finger reciprocating mechanism of the third robot arm.
624 First lifting plate of the third robot arm.
625 Second lifting plate of the third robot arm.
626 Connection portion of the third robot arm.
650 Imaging device for the third robot arm.
700 Fourth robot arm.
710 Printer.
800 Case storage mechanism.
805 Wall attaching/detaching device.
810 Mounting table.
811 Circular table of the turntable.
812 Main body of the mounting table.
820 Suction mechanism.
821 Housing of the suction mechanism.
822 Guide rail of the case storage mechanism.
823 Bellows chucks.
824 Support plate for the suction mechanism.
824a Contact plate of support plate for suction mechanism.
825 Slide bar of the suction mechanism.
850 Turntable of the case storage mechanism.
860 Rotation power mechanism for the turntable of case storage mechanism.
865 Shaft of rotation power mechanism.
900 First control device.
910 CPU of the first control device.
920 Memory of the first control device.
921 Container type data.

922 Individual container data.
923 Key data.
930 Display unit.
940 Operation unit of the first control device.
960 Communication interface of the first control device.
970 Speaker of the first control device.
1000 Second control device.
1100 Third control device.
Bf Front handle of the bill storage case.
Br Rear handle of the bill storage case.
Dy Front direction of the fixed finger of the second robot hand.
Cv Notch in fixed finger of the second robot arm.
Ll Left lock mechanism of the bill storage case.
Lr Right lock mechanism of the bill storage case.
MT Bill bundle.
OP Opening of the top surface of bill storage case.
RA Robot arm section.
Rl Left side receiving portion.
Rr Right side receiving portion.
Rs Semicircular notch of the holding plate of the bill storage container.
Rt space or slit between support bases of bill storage container.
SA Support arm of the second robot hand 302.
Sl Right lock pin of bill storage case.
Sr Rubber sheet material of fingers, or left lock pin of bill storage case.
Tm Tip portion of protruding portion of movable finger.
Ts Tip portion of protruding portion of fixed finger.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features, components, and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to automatic bill handling systems and their associated components and methods of use. Some establishments or businesses, such as (but not limited to) casinos, receive and store multiple bank notes, bills, printed gaming tickets (which may have encoded value encoded in the printing), printed documents, or other paper notes. As stated, these and other types of paper (or other material) notes will be referred to herein as "bills." Such bills may be received and stored at various machines or devices in the establishments; as an example, a casino may operate multiple slot machines or betting tables which receive and store bills. The bills may be received and stored in a secure or locked bill storage container, which may be locked before removal and movement to another location for emptying, sorting, or other operations. The bills in the bill storage container may be organized into a bundle.

The embodiments described herein are directed to devices, systems, and methods for automatic handling of the bill storage container. Such an automatic bill handling system may include multiple robot arms. In general, in the embodiment shown in FIGS. 1 and 2, there are four robot arms. Generally, in the embodiment of FIGS. 1 and 2, a bill storage container is placed onto a box conveying device operable to move, and reposition if need be, the bill storage container to be positioned so that a first robot arm can unlock and/or open it. The first robot arm may unlock the bill storage container, and possibly open it. A second robot arm may be equipped with a robot hand to be operable to remove a bundle of bills from the bill storage container. The second robot arm may place the bill bundle on a bill conveying device, which moves the bill bundle in proximity to a third and a fourth robot arm.

The fourth robot arm may receive a printed piece of paper from a printer, and place it on the bill bundle. The third robot arm may be configured to take the bill bundle from the bill conveying device and place it in a bill storage case mounted on a case storage mechanism. The bill storage case may be configured to receive multiple bill bundles.

The case storage mechanism may be configured on a turntable. The case storage mechanism may include a mechanism for temporarily removing a front end of the bill storage case while the third robot arm places one or more bill bundles into the bill storage case.

Such automatic bill handling systems may include one or more control devices. Such control devices may control operations of the box conveying device, the robot arms, the box conveying device, the case storage mechanism, and/or other components.

These and other embodiments are discussed below with reference to FIGS. 1-19. However, those skilled in the art will readily appreciate that the detailed description given herein with respect to these Figures is for explanatory purposes only and should not be construed as limiting.

Figure 2:
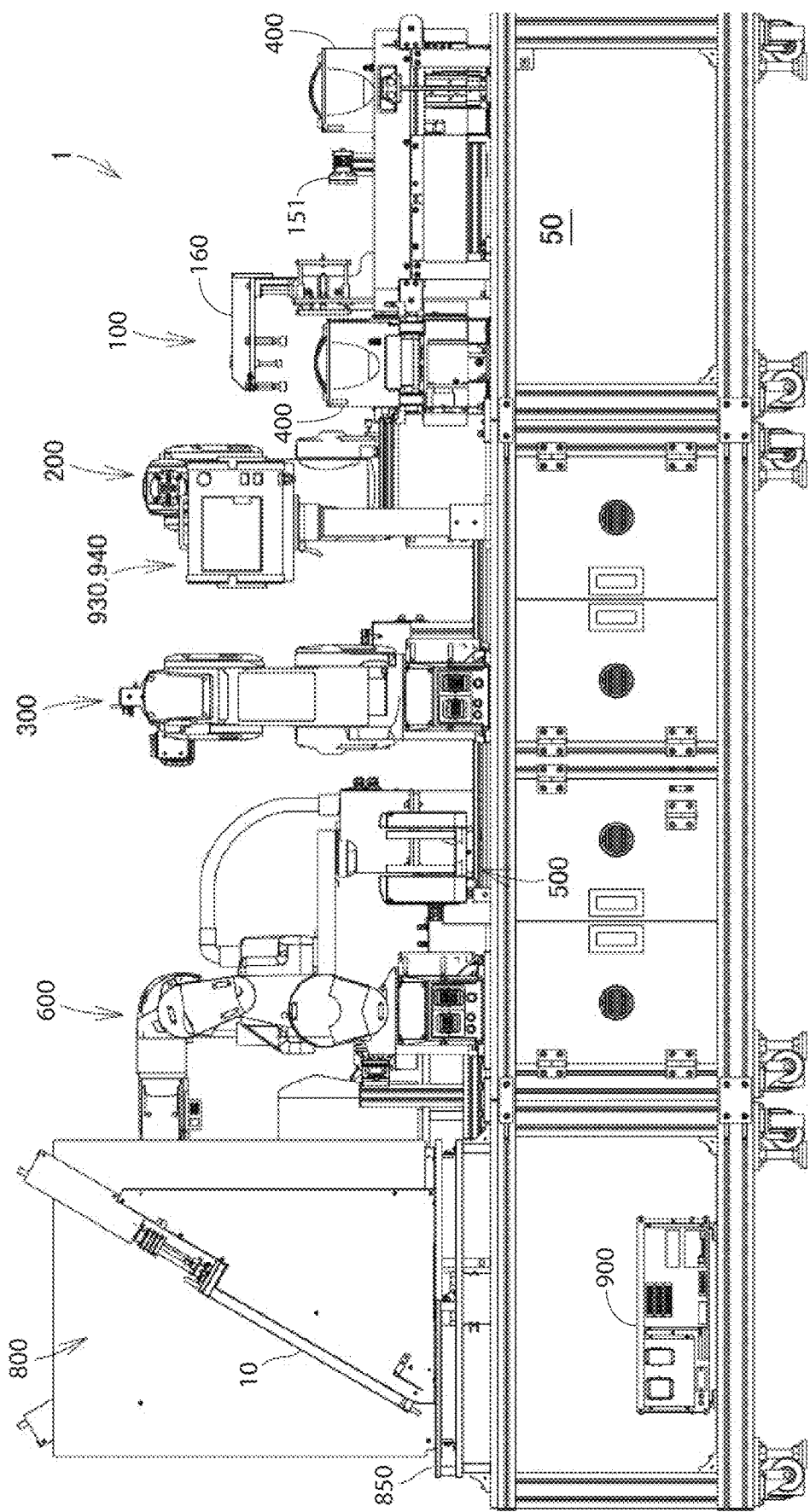
FIG. 2 shows a side view of the automatic bill handling system of FIG. 1.

FIGS. 1 and 2 show respectively a plan and a side view of an exemplary automatic bill handling system 1. As shown in FIGS. 1 and 2, the automatic bill handling system 1 includes, among other components to be described, a box conveying device 100, a box sensor 150, a box reversing device 160, a first robot arm 200, a second robot arm 300, a bill conveying device 500, a printer 710, a fourth robot arm 700, a third robot arm 600, imaging devices 151 and 650, a case storage mechanism 800, and a first control device 900 for controlling one or more of these components. In the present embodiment, these devices are mounted on a base 50. More specifically, the first control device 900 may be housed under the base 50; other control or operation units, such as operation unit 940 and a display unit 930, may be disposed on the base 50. Additionally and/or alternatively, different control devices other than first control device 900, such as control devices 1000 and 1100 described below, may be included.

The box conveying device 100 is disposed in front of the base 50. The first robot arm 200 is disposed on the front left side of the box conveying device 100. The second robot arm 300 is disposed on the rear right side of the box conveying device 100. The fourth robot arm 700 is disposed behind the first robot arm 200, and the printer 710 is disposed behind the fourth robot arm 700. The third robot arm 600 is disposed behind the second robot arm 300, and the case storage unit is disposed behind the third robot arm 600. The bill conveying device 500 may be positioned in an area extending between the first robot arm 200 and the second robot arm 300 to the fourth robot arm 700 and the third robot arm 600.

Functions, configurations, and operations of various components and parts of the automatic bill handling system 1 will now be described. Further descriptions of these and other components may also be described further in reference to other figures. In the following description, for the sake of explanation, a direction from the third robot arm 600 toward the second robot arm 300 is referred to as a front side direction; a direction from the second robot arm 300 toward the third robot arm 600 is referred to as a rear side direction; a direction from the first robot arm 200 toward the second robot arm 300 is referred to as a right side direction; a direction from the second robot arm 300 toward the first robot arm 200 is referred to as a left side direction; the vertical upward direction is referred to as an upper side direction; the vertical downward direction is referred to as a lower side direction. The upper side in FIG. 1 is referred to as the front side of each device; the lower side in FIG. 1 is referred to as the rear side of each device; the right side in FIG. 1 is referred to as the right side of each device; the left side in FIG. 1 is referred to as the left side of each device; the front direction of the paper in FIG. 1 is referred to as the upper side of each device; the back direction of the paper in FIG. 1 is referred to as the lower side of each device.

Figure 4A:
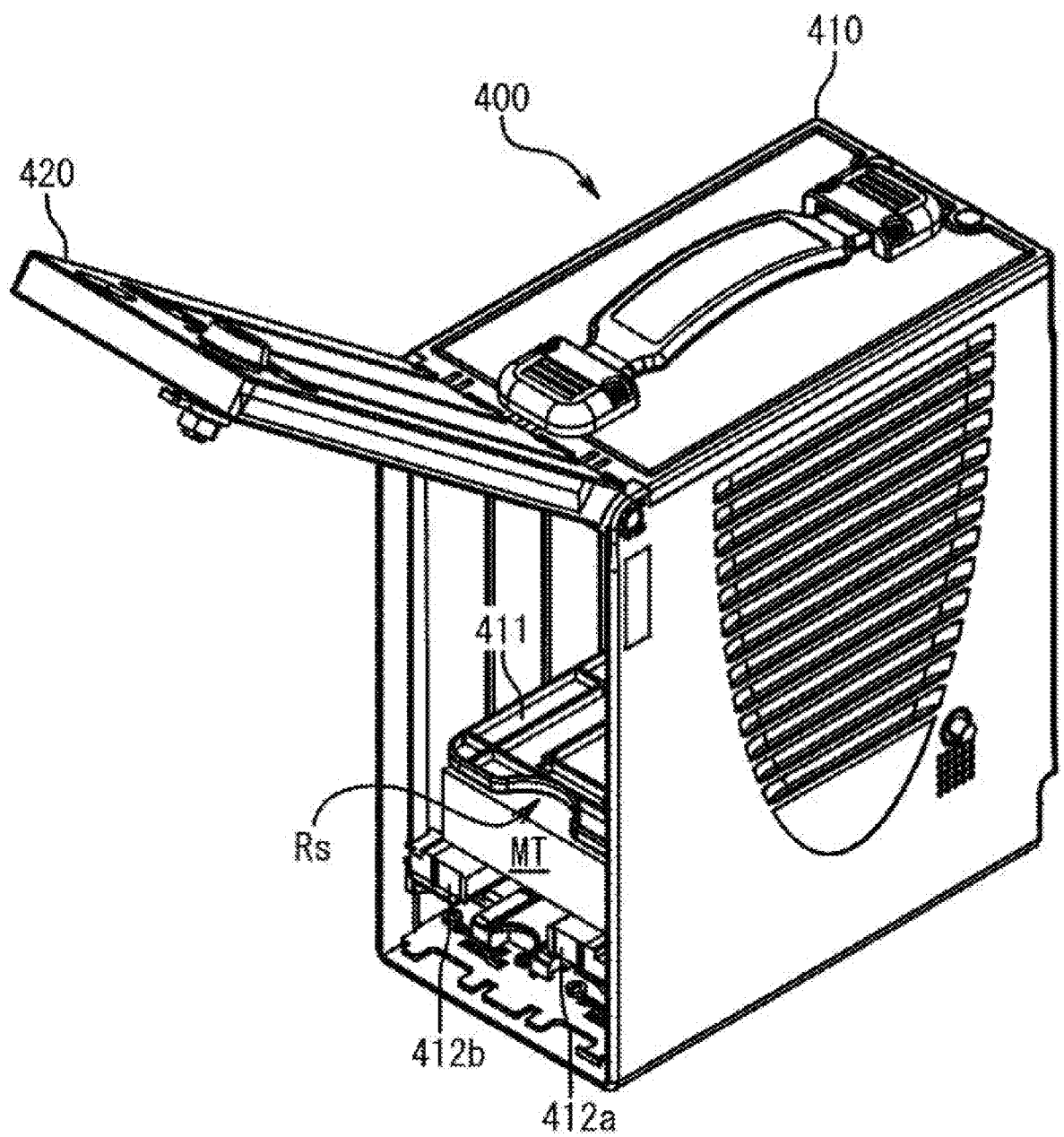
FIG. 4A shows a perspective view of a bill storage container containing a bill bundle.

The configuration of the box conveying device 100 will now be described. A bill storage container 400 as shown in FIG. 4A is placed on an end portion (front side in FIG. 1) of the box conveying device 100, such as by an employee of a casino. The bill storage container 400 may contain bills stacked into a bundle. The box conveying device 100 conveys the bill storage container 400 to the vicinity of the first robot arm 200.

In the embodiment shown in FIGS. 1 and 2, the bill storage container 400 has an integrated circuit (IC) tag (or RFID tag, or the like) for storing information that is embedded in a place where a key hole is disposed in the bill storage container 400 or a place on the back surface of the front lid in the bill storage container 400. For example, the IC tag may store various types of information relating to the bill storage container 400; examples of the information relating to the bill storage container 400 include a type of the bill storage container 400, identification information, the gaming machine from which it was taken, or other information. Additionally and/or alternatively to the IC tag, the box sensor 150 may obtain various information about the bill storage container 400 using various technologies. For example, the box sensor 150 may include an IC sensor, an infrared sensor, a bar code sensor, a proximity sensor, or the like.

The type, or other information, regarding the bill storage container 400 may be obtained by imaging the bill storage container 400 with a box image sensor 151 (such as a camera or other optical imaging device) positioned in the vicinity of the box conveying device 100. In addition, the box sensor 150 may use optical sensor(s), RFID, or other communication technologies to read out various types of information regarding the bill storage container 400. In the present embodiment, the first control device 900 (such as is described in relation to FIG. 17A) may obtain the type, the size, the position of a key hole, the angle of the key hole, and other information with respect to the bill storage container 400 using data from the box sensor 150. Additional and/or alternative information may also be obtained by the first control device 900 from an imaging unit 350 attached to the second robot arm 300.

When the location or direction of the key hole of the bill storage container 400 is not on a side where the first robot arm 200 is disposed, the first control device 900 may cause the box reversing device 160 to change the direction or orientation of the bill storage container 400.

Figure 4B:
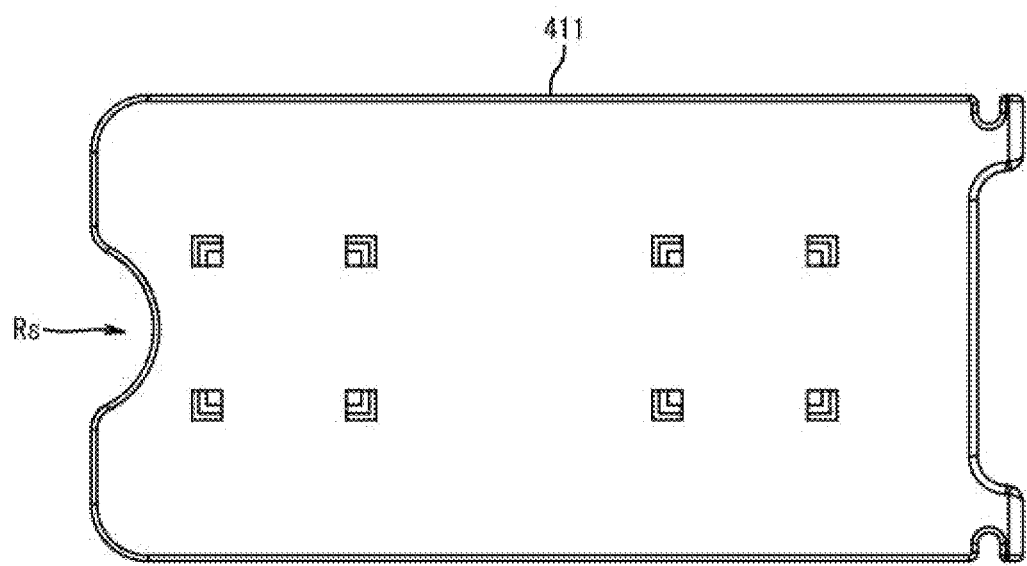
FIG. 4B shows a plan view of a holding plate of a bill storage container.
Figure 4C:
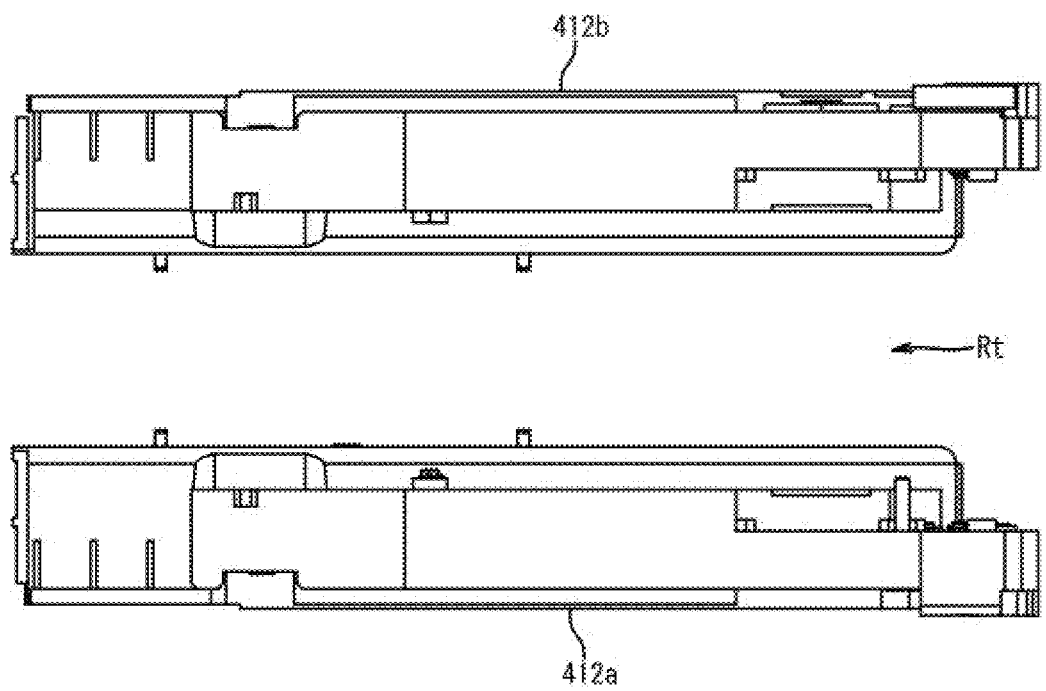
FIG. 4C shows side views of support bases of a holding plate of a bill storage container.

As shown in FIGS. 4A-4C, the bill storage container 400 includes a housing 410, a front lid 420, a holding plate 411, and support bases 412a and 412b. As shown in FIG. 4A, the housing 410 may be a rectangular parallelepiped box having a front lid 420 that can be opened. The depth dimension of the housing 410 is sufficiently longer than the length of the fixed finger 320 of the second robot arm 300 described below. The front lid 420 is a plate member having a substantially rectangular shape, and is rotatably supported on the upper side of the opening edge of the housing 410 via an opening/closing mechanism, such as a hinge. The holding plate 411 is a member for holding a bill bundle MT in cooperation with the support bases 412a and 412b, and is disposed so as to be movable above the center in the height direction of the housing 410. A semicircular notch Rs is provided at the center of the front side of the holding plate 411. The support bases 412a and 412b may be left and right separation type support members that hold the bill bundle MT in cooperation with the holding plate 411, and are fixed to the left and right of the lower side of the housing 410. A space or gap Rt is formed between the support bases 412a and 412b. The slit or space Rt extends in the depth direction. In the bill storage container 400, the holding plate 411 is pushed downward by an urging member (a helical spring or the like) placed on the upper side. The bill bundle MT accommodated in the bill storage container 400 is pressed toward the support bases 412a and 412b by the holding plate 411. As shown in FIG. 4A, the bill storage container 400 stores the bill bundle MT between the support bases 412a and 412b and the holding plate 411 such that the longitudinal direction of the bill is along the depth direction.

Figure 3:
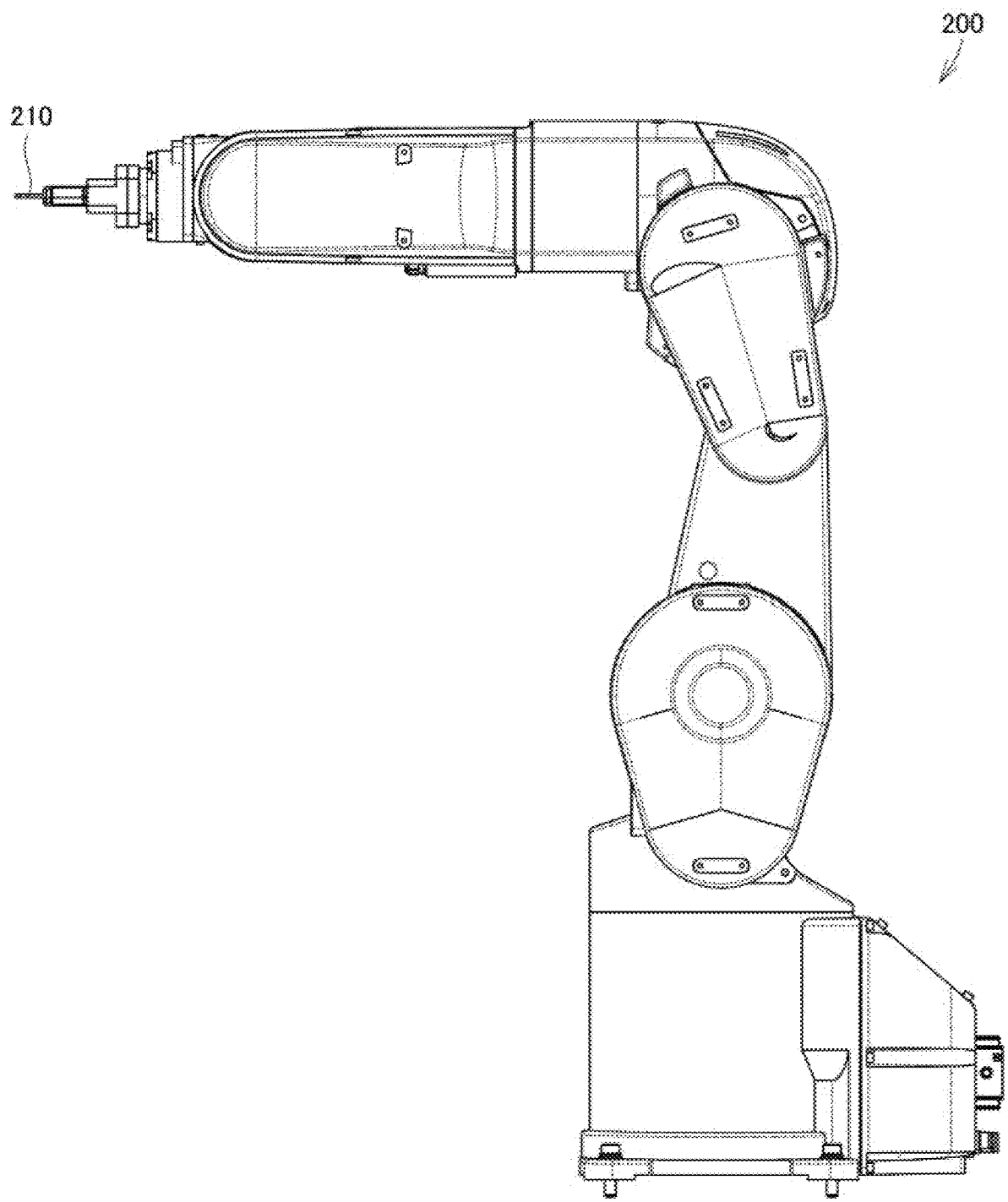
FIG. 3 shows a side view of a first robot arm.

In the present embodiment, as shown in FIG. 3, the first robot arm 200 includes a key 210 for unlocking a front lid 420 of the bill storage container 400. For example, the first robot arm 200 inserts the key 210 into the key hole of the bill storage container 400 by moving the position of the key 210 back and forth, left and right, and/or up and down, or rotating the key 210 based on information on the position and angle of the key hole from the first control device 900. The first robot arm 200 unlocks the bill storage container 400 by rotating the key 210 based on a command from the first control device 900, and opens the front lid 420. In some embodiments, the first control device 900 may also use image data obtained from the imaging unit 350 of the second robot arm 300 so that the key 210 is inserted into the key hole by accurately specifying the up, down, left, and right positions of the key hole and the rotation angle of the keyhole.

The first robot arm 200, as well as the other robot arms to be described, may be mounted on a section that rotates with respect to the base 50 of the automatic bill handling system 1.

Figure 5A:
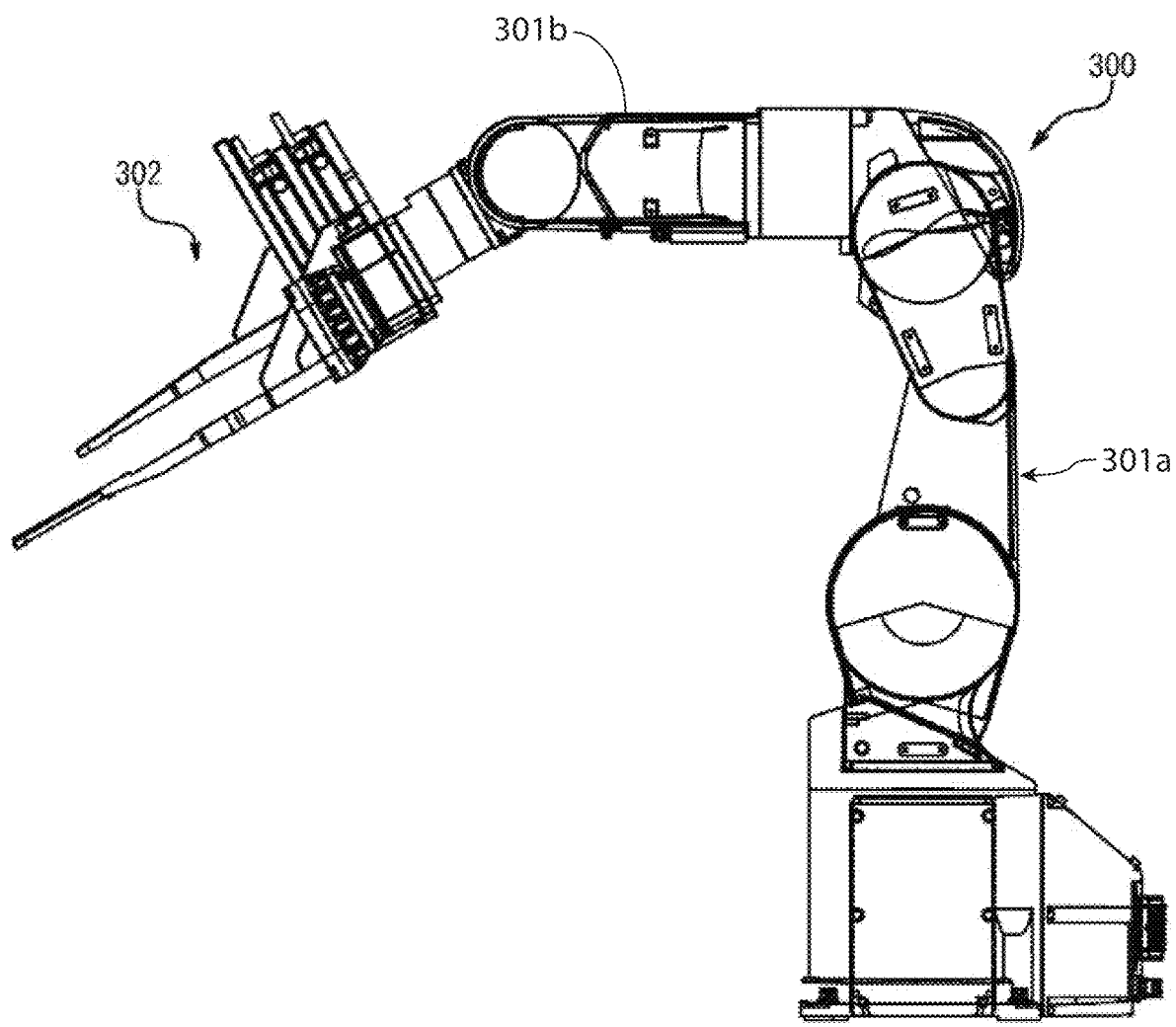
FIG. 5A shows a side view of a second robot arm.
Figure 5B:
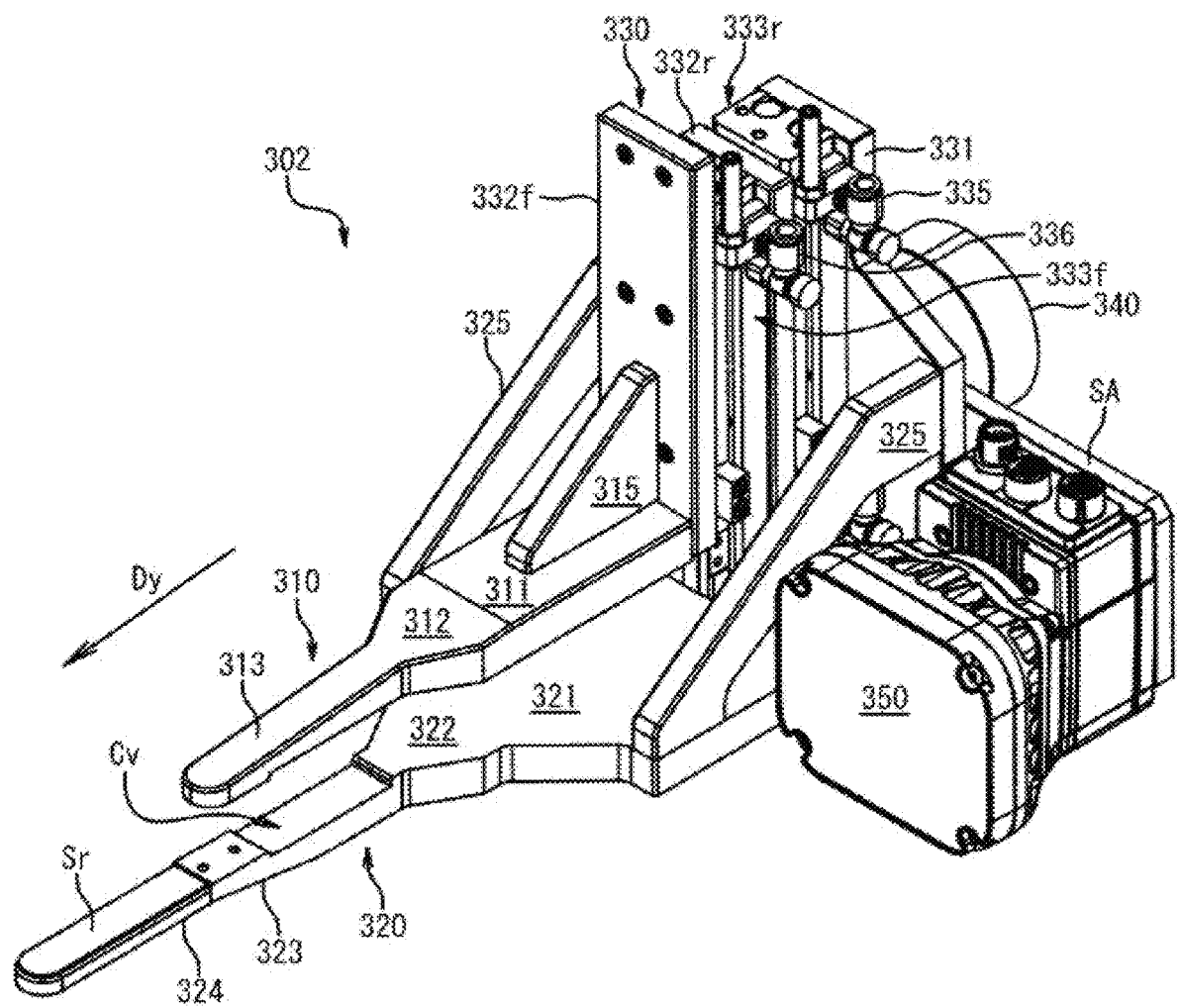
FIG. 5B shows a perspective view of components of a robot hand.
Figure 5C:
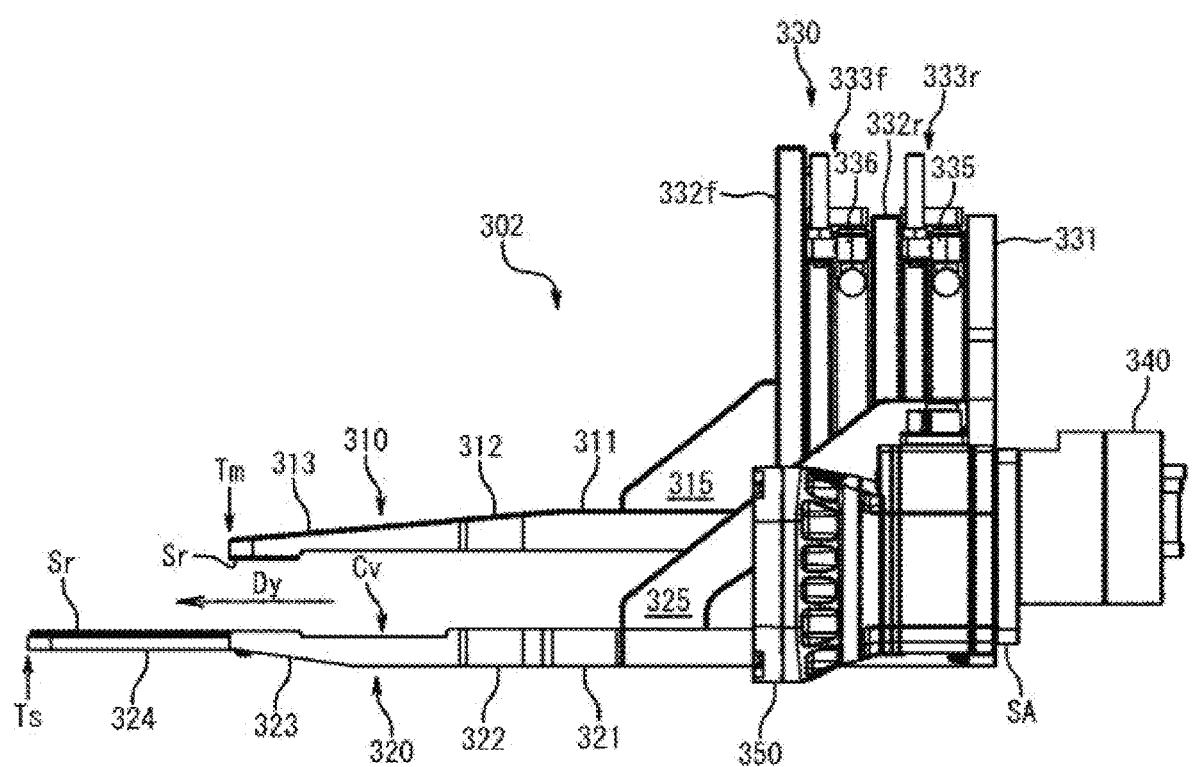
FIG. 5C shows a side view of components of a robot hand.

FIGS. 5A-5C show details and components of the second robot arm 300. The second robot arm 300 includes two articulated sections 301a and 301b. The second robot arm 300 also includes a robot hand 302 attached to the end of the articulated robot section 301b and configured for grasping and extracting the bill bundle MT in the bill storage container 400, and may be operated by the first control device 900. Details of the operations of the second robot arm will be described below.

The robot hand 302 is a two-finger type robot hand as shown in FIGS. 5B-5C. The robot hand 302 includes a movable finger 310, a fixed finger 320, a movable finger lifting mechanism 330, a connecting portion 340, and a second robot arm imaging unit 350.

The movable finger 310 is formed with a base portion 311, an intermediate portion 312, and a claw portion 313. The base portion 311 is a thick plate portion having a substantially rectangular shape. The intermediate portion 312 is a substantially trapezoidal thick plate portion, and extends from the tip of the base portion 311 toward the front Dy. Note that the width of the intermediate portion 312 narrows toward the front Dy. The claw portion 313 is an elongated substantially rectangular thick plate portion, and extends from the tip of the intermediate portion 312 toward the front Dy. In the illustrated embodiment, the tip portion of the claw portion 313 has a shape protruding downward as shown in FIG. 7. In the movable finger 310, the upper surface of the movable finger 310 is inclined downward from the base end of the intermediate portion 312 toward the tip of the claw portion 313 in a region from the base end of the intermediate portion 312 to the tip of the claw portion 313. A rubber sheet Sr is attached to the lower surface of the claw portion 313. The movable finger 310 is fixed to a front lifting plate 332f (as described later) of the movable finger lifting mechanism 330 on the base end side of the base portion 311. Further, a reinforcing plate 315 is provided to enhance the coupling strength between the movable finger 310 and the front lifting plate 332f. The reinforcing plate 315 is fixed to both the movable finger 310 and the front lifting plate 332f.

Figure 6A:
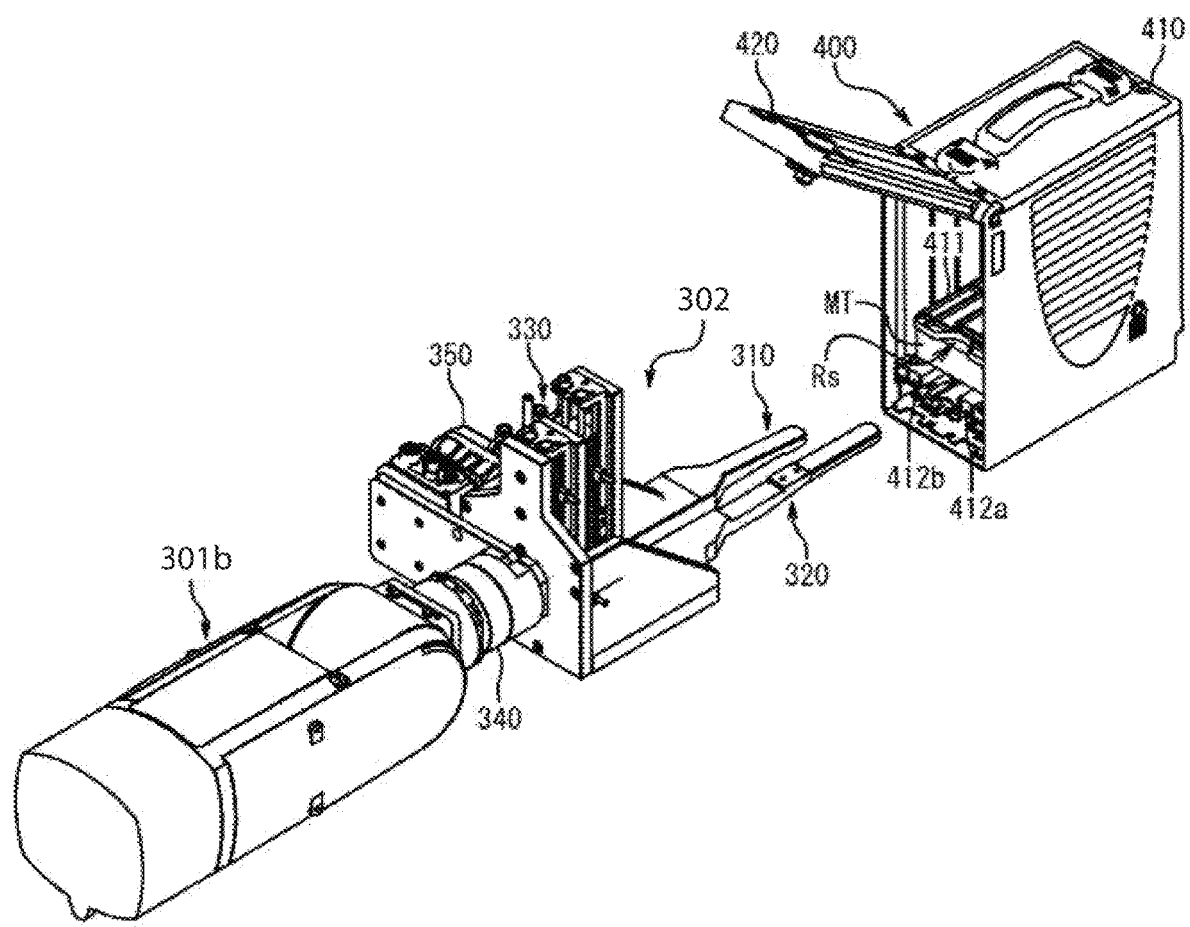
FIG. 6A shows a perspective view of a robot hand and a bill storage container.
Figure 6B:
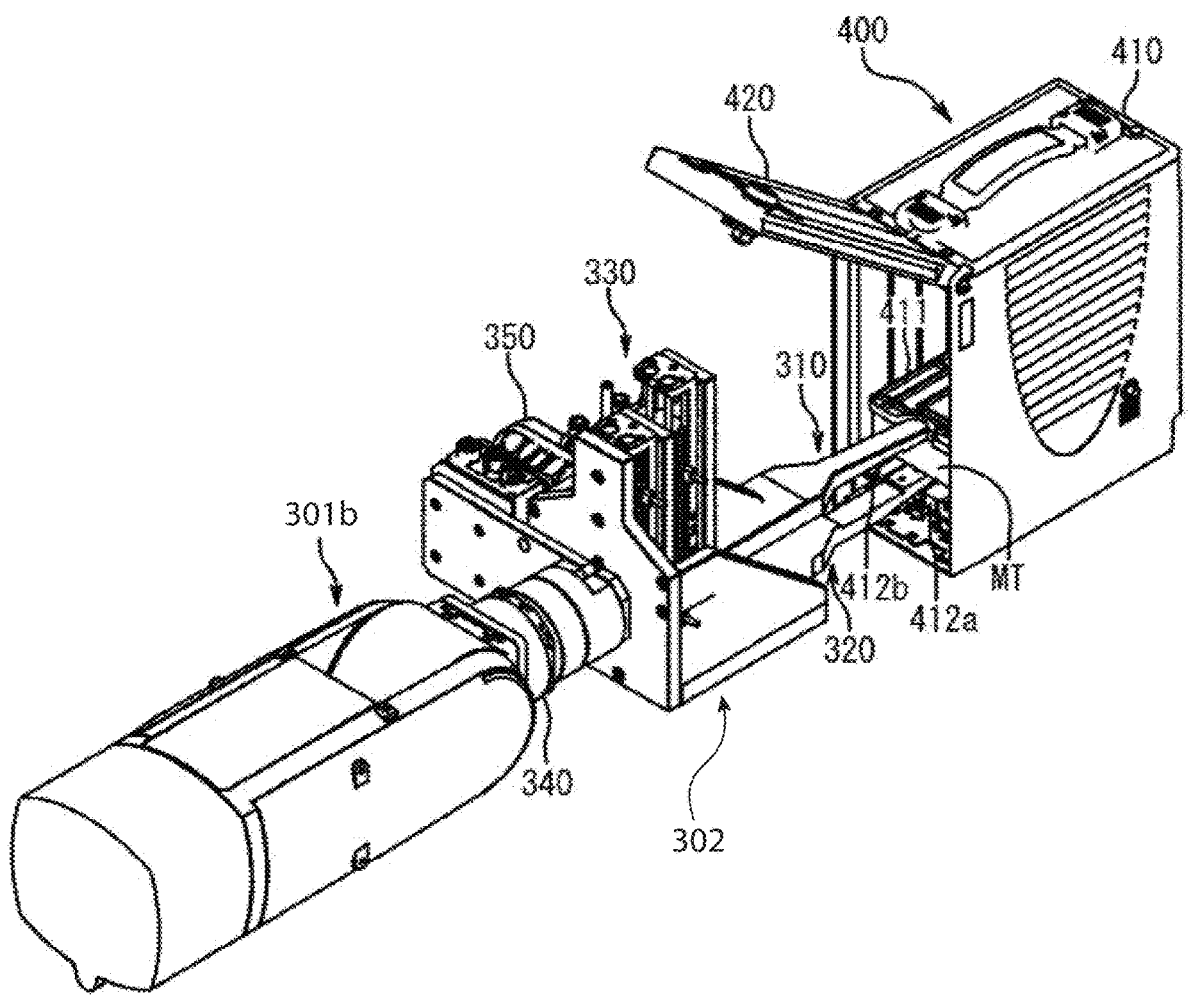
FIG. 6B shows a perspective view of a robot hand inserted into a bill storage container.

As shown in FIGS. 5B-5C, the fixed finger 320 is formed with a base portion 321, an intermediate portion 322, a claw portion 323, and a protruding portion 324. The base portion 321 is a thick plate portion having a substantially rectangular shape. The intermediate portion 322 is a substantially trapezoidal thick plate portion, and extends from the tip of the base portion 321 toward the front Dy. Note that the width of the intermediate portion 322 narrows toward the front Dy. The claw portion 323 is an elongated substantially rectangular thick plate portion, and extends from the center in the width direction of the side surface on the tip side of the intermediate portion 322 toward the front Dy. A notch Cv is provided on the upper side of the claw portion 323. As a result, the tip portion of the claw portion 323 has a shape protruding upward. Further, in the fixed finger 320, the lower surface of the fixed finger is inclined upward from the intermediate portion 322 toward the tip in a region from the intermediate portion 322 to the tip of the claw portion 323. The protruding portion 324 is a substantially rectangular thick plate portion having the same width as that of the claw portion 323, and extends from the tip of the claw portion 323 toward the front Dy. The tip portion Ts of the protruding portion 324 is located in front of the tip portion Tm of the claw portion 313 of the movable finger 310. In other words, the protruding portion 324 of the fixed finger 320 protrudes forward in a direction of Dy compared with a portion of the claw portion 313 of the movable finger 310. Further, a rubber sheet Sr as a slip prevention material is attached to the protruding portion 324. A portion to which the rubber sheet Sr has been attached does not face a region where the rubber sheet Sr of the movable finger 310 has been attached. The fixed finger 320 is fixed to a support plate 331 (described later) of the movable finger lifting mechanism 330. Further, a pair of reinforcing plates 325 are disposed on the left and right sides in order to enhance the bonding strength between the fixed finger 320 and the support plate 331. The reinforcing plates 325 are fixed to both the fixed finger 320 and the support plate 331. As shown in FIGS. 6A, 6B, and 7, the fixed finger 320 faces the movable finger 310 in the lifting direction of the movable finger 310.

The movable finger lifting mechanism 330 is a two-stage stroke type lifting mechanism, and includes a support plate 331, a front lifting plate 332f, a rear lifting plate 332r, a front air cylinder mechanism 333f, and a rear air cylinder mechanism 333r. The support plate 331 supports the rear air cylinder mechanism 333r. The rear air cylinder mechanism 333r operates in a double-acting manner, and is a driving source for raising and lowering the rear lifting plate 332r. The rear air cylinder mechanism 333r is attached to the support plate 331 as described above. A front air cylinder mechanism 333f is attached to the rear lifting plate 332r. The front air cylinder mechanism 333f operates in a double-acting manner and is a driving source for raising and lowering the front lifting plate 332f. As described above, the movable finger 310 is attached to the front lifting plate 332f. In other words, the rear air cylinder mechanism 333r raises and/or lowers the rear lifting plate 332r, thereby raising and/or lowering the front air cylinder mechanism 333f, the front lifting plate 332f, and the movable finger 310. In contrast, the front air cylinder mechanism 333f raises and/or lowers the front lifting plate 332f, thereby raising and/or lowering the movable finger 310. Also, the air supply/exhaust ports 335 and 336 are provided in the front air cylinder mechanism 333f and the rear air cylinder mechanism 333r, respectively. The air supply/exhaust ports 335 and 336 are each connected to an air supply/exhaust pipe (not shown).

The connecting portion 340 is a portion for connecting the robot hand 302 to the second robot arm 300, and is, for example, a flange or the like.

The second robot arm imaging unit 350 may be, for example, a camera such as a CMOS, CCD, or other type of camera, and is fixed to the right side of the movable finger lifting mechanism 330 with a support arm SA extending from a support plate 331 of the movable finger lifting mechanism 330. The camera may capture either single or multiple images, or may capture video sequences. The second robot arm imaging unit 350 may transmit, such as to first control device 900, electronic data related to the captured images.

Variations of configurations for the number and positions of the fixed and movable fingers will be described below in relation to FIGS. 16A-16K.

The second robot arm 300 is operable to extract the bill bundle MT in the bill storage container 400, as may be operated by the first control device 900, as will now be described. First, the first control device 900 controls the operation of the second robot arm 300 to move the robot hand 302 to a prescribed position and move it in a prescribed direction (see FIG. 6A). In the illustrated embodiment, the prescribed position is a position on the front side of the bill storage container 400, and the prescribed direction is a direction in which the second robot arm imaging unit 350 can image the front side of the bill storage container 400.

Figure 6C:
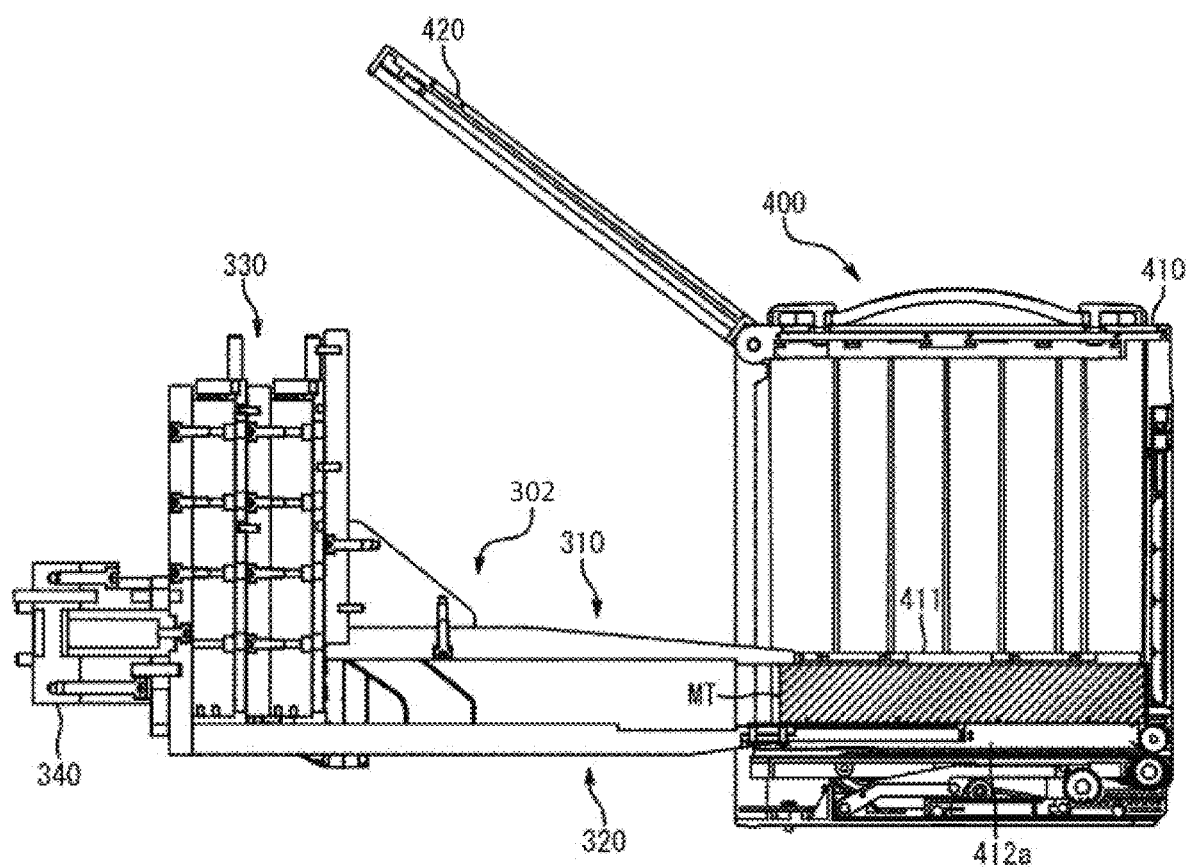
FIG. 6C shows a side view of a robot hand inserted into a bill storage container.

Next, as illustrated in the sequence of FIGS. 6A-6C, the first control device 900 controls the second robot arm 300 and the robot hand 302 to raise the movable finger 310 to the highest position, and then inserts the tip portion of the fixed finger 320 into the slit Rt of the support bases 412a and 412b (see FIGS. 4A-4C). At this time, the movable finger 310 is positioned above the notch Rs of the holding plate 411, and the fixed finger 320 is positioned directly below the bill bundle MT, as shown in FIG. 6B. Further, at this time, the fixed finger 320 is inserted to an intermediate position of the slit Rt, whereas the movable finger 310 is inserted only to a position above the notch Rs of the holding plate 411, as shown in FIG. 6B. That is, the fixed finger 320 contacts the lower surface of the bill bundle MT over a length of about half of the bill bundle MT in the longitudinal direction, whereas the movable finger 310 contacts only the upper surface of the bill bundle MT on the near side of the bill bundle MT, as shown in FIG. 6C.

Subsequently, the first control device 900 causes the movable finger 310 to move downward to grasp the bill bundle MT together with the fixed finger 320. The first control device 900 controls the operation of the second robot arm 300 to retract the robot hand 302, thereby extracting the bill bundle MT from the bill storage container 400.

In the present embodiment, as will be described below, the first control device 900 controls the operation of the second robot arm 300 to deliver the bill bundle MT to the bill conveying device 500 without changing the orientation of the robot hand 302. This allows the second robot arm 300 to quickly shift to the process of imaging the key hole for the next bill storage container 400 placed on the box conveying device 100 and the process of taking out bills.

Figure 7A:
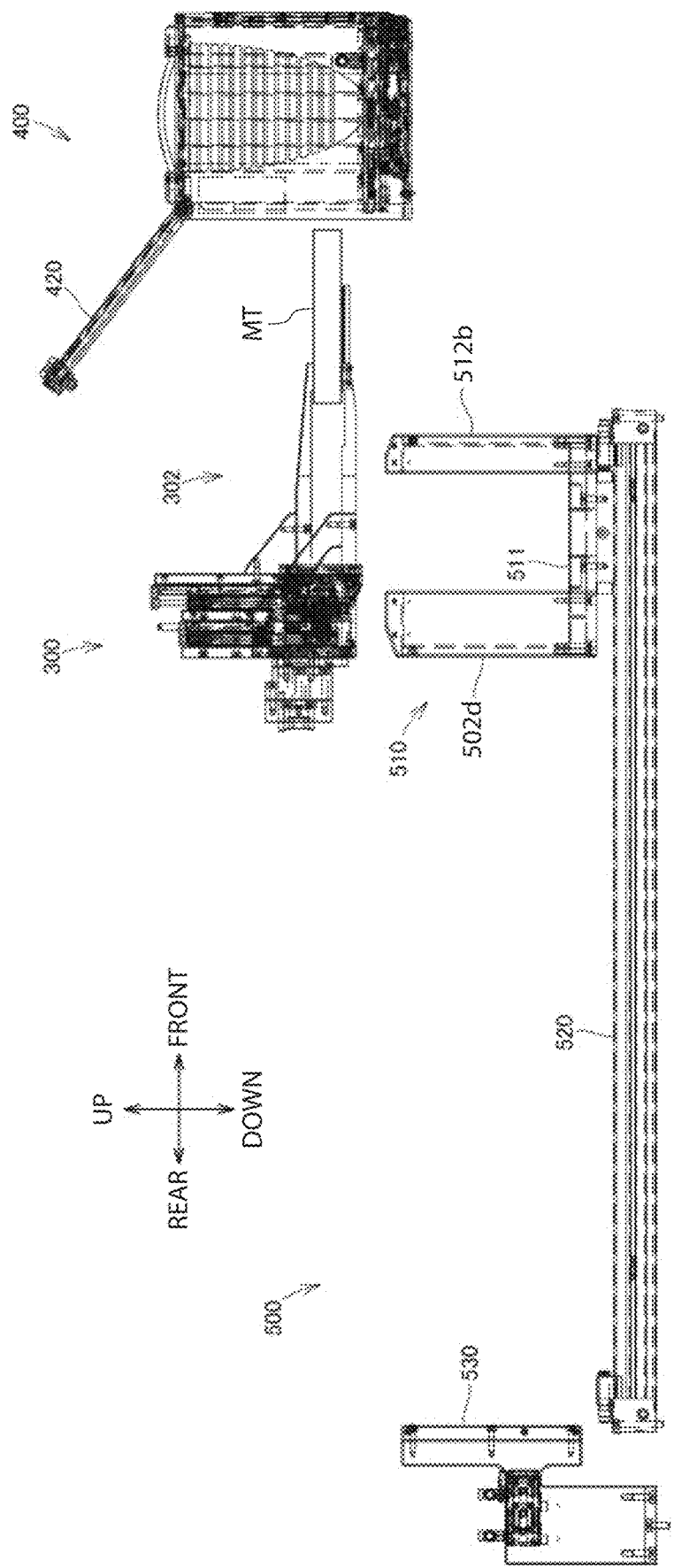
FIG. 7A shows a side view of a bill conveying device.
Figure 7B:
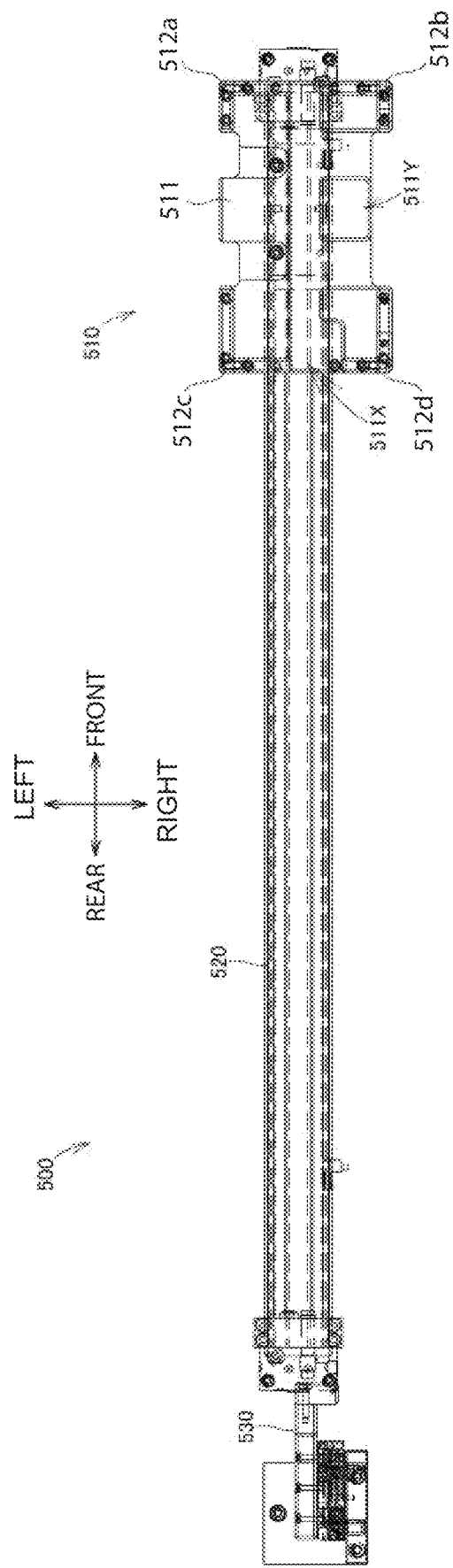
FIG. 7B shows a plan view of a bill conveying device.

As shown in FIGS. 1 and 2, the automatic bill handling system 1 includes the bill conveying device 500 positioned at a substantially central portion of the base 50, and configured to move the bill bundle MT received from the second robot arm 300 to the vicinity of the third robot arm 600 while maintaining the state of the bill MT. Referring to FIGS. 7A-7B, the bill conveying device 500 includes a storage unit 510 for storing bills, a slide mechanism 520 for moving the storage unit 510 from a side of the first robot arm 200 to a side of the third robot arm 600, and an arranging mechanism 530 for arranging bills.

The storage unit 510 includes a bottom surface 511 on which bills are to be placed, and wall portions 512a, 512b, 512c, and 512d for surrounding four corners of the bills so that the bills do not protrude from the storage unit 510. The width and the positional relationship of the wall portions 512a-d may be easily adjustable to accommodate a plurality of bills from a plurality of countries. For example, for a relatively large-sized bill, a gap between the bill and the wall portions 512a-d is small, whereas for a relatively small-sized bill, a gap between the bill and the wall portions 512a-d is large. The size of the space surrounded by the wall portions 512a-d may be set to be slightly larger than the inner dimension of the bill storage container.

As will be described later, a groove portion 511X for pulling out the fixed finger 320 of the robot hand 302 of the second robot arm 300 toward the rear side is formed on the bottom surface 511 in the front-rear direction. A groove 511Y into which the fixed finger 120 of the third robot arm 600 is to enter is formed on the bottom surface 511 in the left-right direction.

In the embodiment shown, the storage unit 510 is opened upward to form a gap into which the second robot arm 300 can insert the bill bundle MT. A space between the two wall portions 512c and 512d on the back side is provided to allow the second robot arm 300 to lower the bill bundle MT into the storage unit 510. Also, another gap is provided between the two wall portions 512d and 512b through which the third robot arm 600 may pass and extract the bill bundle MT. However, the shape of the storage unit 510 may be any shape with which the bill bundle MT can be quickly inserted, and it should not be limited to such a form. For example, a configuration in which a gap is formed only on one side surface and the first robot arm 200 and the second robot arm 300 share the gap may be employed.

The slide mechanism 520 may have various configurations: its configuration should not be understood as limited to that shown in FIGS. 7A-7B as long as the storage unit 510 can slide in the front-rear direction. For example, an actuator having the storage unit 510 attached to its tip end may be slid by a motor; alternatively, a chain or a belt moving together with the storage unit 510 may be driven by using a drive roller driven by the motor.

Figure 8A:
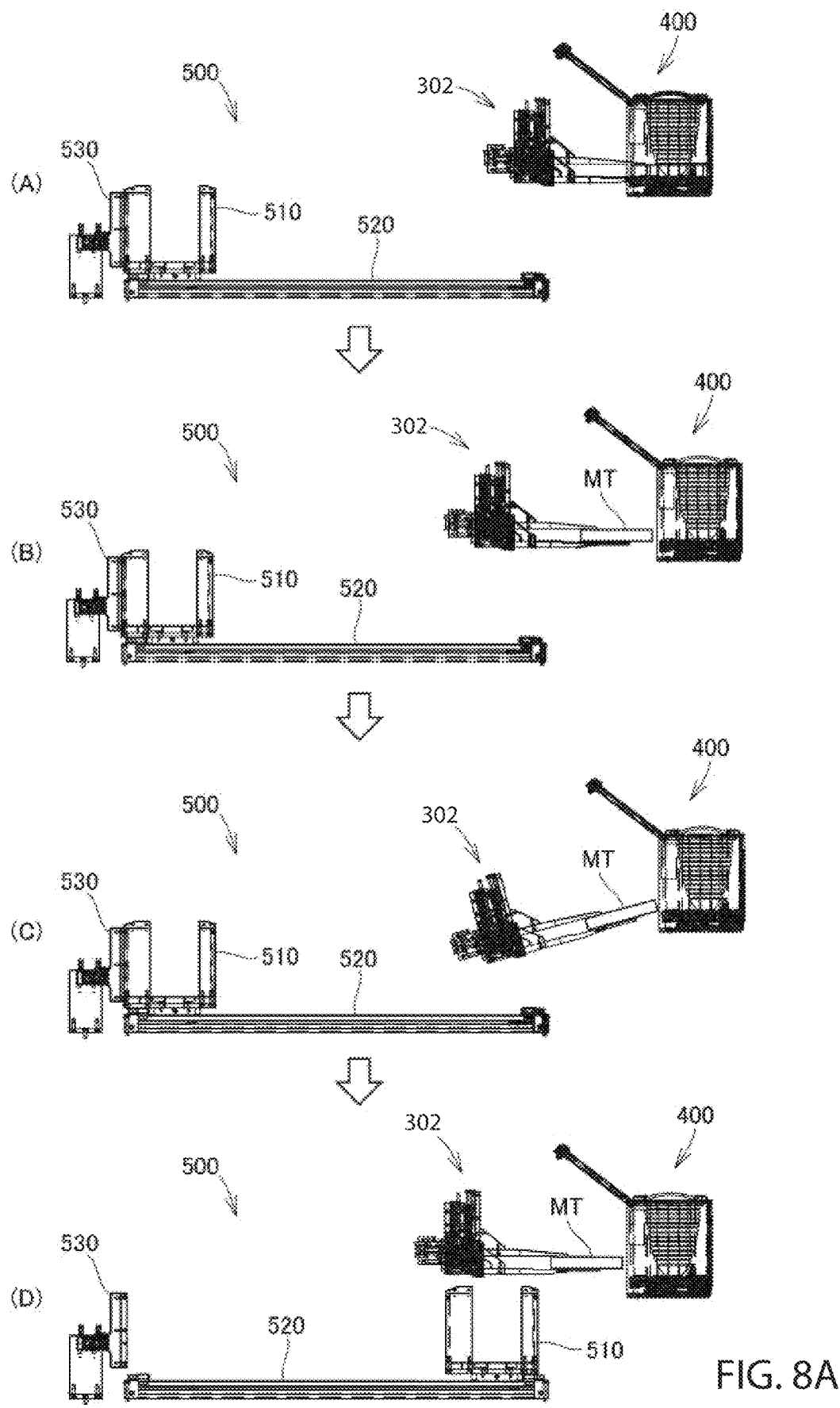
FIG. 8A shows preliminary stages of a movement of a bill bundle from a bill storage container to a bill conveying device by a robot hand.
Figure 8B:
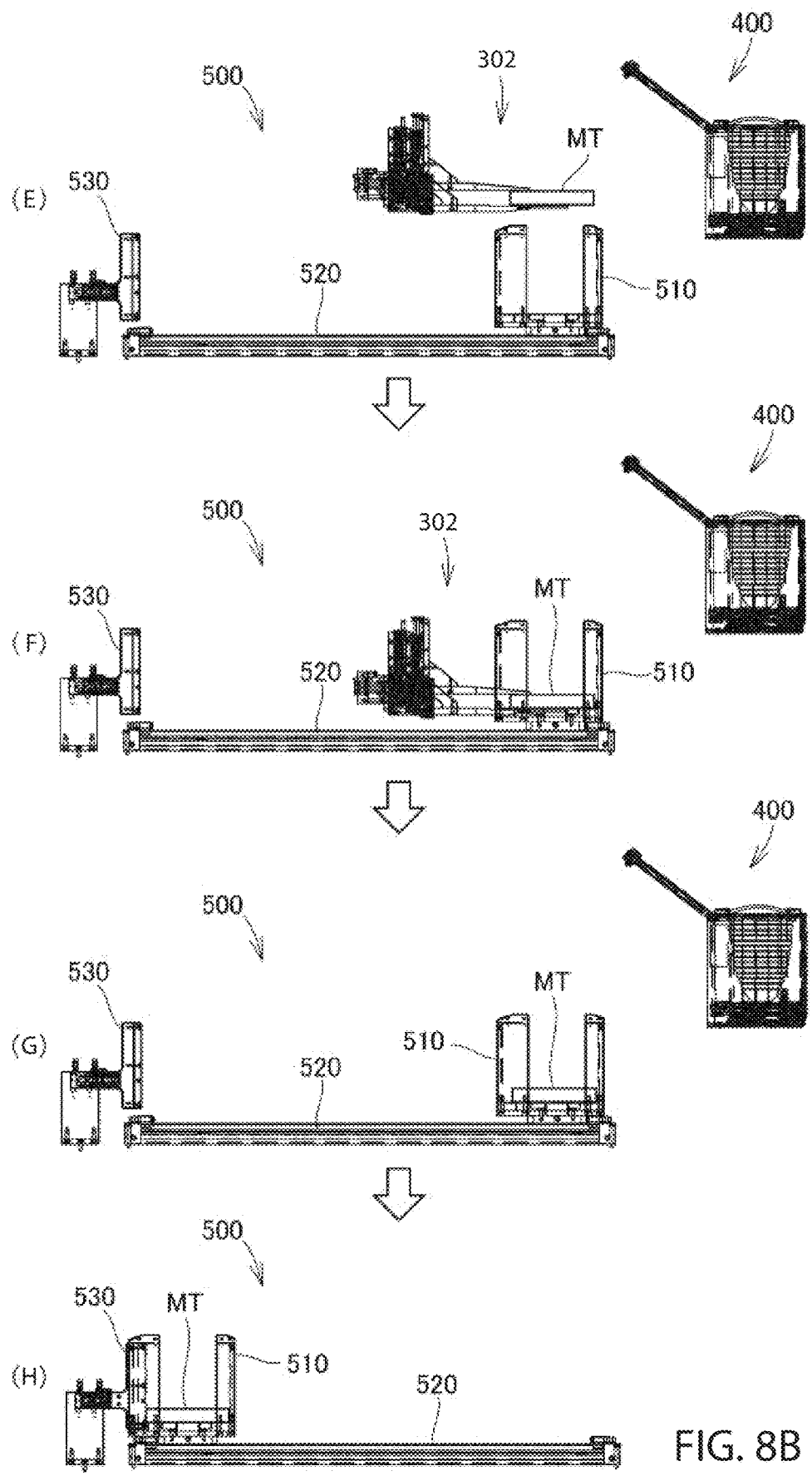
FIG. 8B shows subsequent stages of a movement of a bill bundle from a bill storage container to a bill conveying device by a robot hand.

FIGS. 8A-8B show operations of the bill conveying device 500 according to the present embodiment. The operation progresses through stages (A) through (H). At stage (A), in an initial state, the storage unit 510 of the bill conveying device 500 stands by in the vicinity of the third robot arm 600. In this state, the bill storage container 400 is conveyed to the vicinity of the second robot arm 300 by the box conveying device 100, and is unlocked by the first robot arm 200, and then the front lid 420 is opened. The second robot arm 300 inserts the robot hand 302 into the bill storage container 400 to grasp the bill bundle MT. The second robot arm 300 may insert the robot hand 302 into the bill storage container 400, pull the bill bundle MT slightly forward, and then re-insert the robot hand 302 into the bill storage container 400 to firmly grasp the bill bundle MT. Then at stage (B) the second robot arm 300 pulls out the bill bundle MT from the bill storage container 400.

At stage (C) the second robot arm 300 pulls out the bill bundle MT from the bill storage container 400, and then images the inside of the bill storage container 400 using the second robot arm imaging unit 350 to confirm whether or not any bills remain.

At stage (D), when it is confirmed that no bills remain, the storage unit 510 is moved forward to the vicinity of the second robot arm 300 along the slide mechanism 520. That is, the slide mechanism 520 moves the storage unit 510 to the left of the base of the second robot arm 300 according to the posture shown in FIG. 1.

At stage (E), the articulated robot arm sections 301a and 301b of the second robot arm 300 move the robot hand 302 directly above the storage unit 510 without changing the posture of the robot hand 302. At stage (F), the articulated sections 301a and 301b of the second robot arm 300 move the robot hand 302 into the storage unit 510 without changing the posture of the robot hand 302. In the embodiment shown, the articulated sections 301a and 301b of the second robot arm 300 lower the robot hand 302 without changing the posture of the robot hand 302. In other words, the articulated sections 301a and 301b of the second robot arm 300 move the robot hand 302 downward while maintaining the direction and inclination of the robot hand 302 itself.

At this time, the claw portions 313 and 323 of the robot hand 302 fall within the storage unit 510, that is, the inside of the wall portions 512a, 512b, 512c, and 512d, and the base portions 311 and 321 of the robot hand 302 falls outside of the storage unit 510. In other words, the intermediate portions 312 and 322 or the base portions 311 and 321 of the robot hand 302 falls between the two wall portions 512c and 512d on the rear side of storage unit 510.

At stage (G), when the robot hand 302 reaches the bottom surface 511 of the storage unit 510, the second robot arm 300 releases the bill bundle MT, and pulls out the robot hand 302 from the storage unit 510. That is, the claw portions 313 and 323 are pulled out rearward through the groove portion 511X and a space between the two wall portions 512c and 512d on the rear side of the storage unit 510. The articulated sections 301a and 301b of the second robot arm 300 move the robot hand 302 to a position away from the path of the bill conveying device 500, for example, to a position to image the key hole of the bill storage container 400.

At stage (H), the slide mechanism 520 moves, such as by a command from first control device 900, the storage unit 510 rearward, that is, to the vicinity of the third robot arm 600. In particular, in the present embodiment, the arranging mechanism 530 for arranging corners of the bill bundle MT surrounded by the wall portions 512a, 512b, 512c, and 512d is attached to the rear end portion of the slide mechanism 520.

The arranging mechanism 530 may be a vertically long resin member and is configured to be movable in the front-rear direction. The arranging mechanism 530 is disposed at a position where the front end portion of the arranging mechanism 530 enters the inside of the wall portions 512c and 512d when the storage unit 510 moves to the rear end portion of the slide mechanism 520. As a result, even if the storage unit 510 moves backward vigorously and suddenly stops at the rear end portion of the slide mechanism 520, the bill bundle MT first comes into contact with the arranging mechanism 530 and loses its momentum, thereby allowing for reducing the possibility that the bills of the bill bundle MT may jump out or be unintentionally ejected from the space between the rear wall portions 512c and 512d, or that the bill bundle MT collides with the rear wall portions 512d and 512d and jumps out or is ejected upward from the storage unit 510.

When the storage unit 510 stops at the back end of the slide mechanism 520, optionally a paper note or receipt printed by the printer 710 may be placed by the fourth robot arm 700 onto the bill bundle MT, as described below. The arranging mechanism 530 vibrates in the front-rear direction. As a result, the front end portion of the arranging mechanism 530 presses the bill bundle against the front wall portions 512a and 512b, thereby causing the corner of the bill bundle MT to be aligned.

In this way, in the present embodiment, the articulated section 301b of the second robot arm 300 enters the bill storage container 400 and grasps the bill bundle MT while maintaining the state in which the robot hand 302 is horizontally and oriented in the front-rear direction. As shown in stage (C), the articulated section 301a of the second robot arm 300 directs the robot hand 302 in the vertical direction (up-and-down direction) to image the inside of the bill storage container 400, but does not swing in the horizontal direction (left-and-right direction). Subsequently, as shown in stages (D) to (H), while maintaining the state in which the robot hand 302 is horizontal and oriented in the front-rear direction, the second robot arm 300 moves the bill bundle MT directly above the storage unit 510 and then moves it down inside the storage unit 510. The operation's sequence of movements reduces the operation of swinging the robot hand 302 in the direction perpendicular to the direction in which the bill is grasped, for example, in the left-right direction in the plan view of FIG. 1.

Note that the robot hand 302 may not be swung in the vertical direction (up-and-down direction). In other words, while maintaining the state in which the robot hand 302 is horizontal and oriented in the front-rear direction, the robot hand 302 may be inserted into the bill storage container 400 to grasp the bill bundle MT, move the bill bundle MT directly above the storage unit 510, and then lower the bill bundle MT into the inside of the storage unit 510.

The printer 710 may print on a sheet, such as a sheet of paper or other material, information indicating that the bill bundle MT has been taken out from the bill storage container 400, and then discharges the sheet. More specifically, in the present embodiment, the first control device 900 acquires identification or other information about the bill storage container 400 from the box sensor 150 as described previously. The first control device 900 transmits the information of the bill storage container 400 to the printer 710. The printer 710 prints the identification or other information of the bill storage container 400 on the sheet, and discharges the sheet.

The fourth robot arm 700 grasps the sheet in a sheet discharge portion of the printer 710 when the bill conveying device 500 conveys the bill bundle MT backward. Note that the identification information of the bill storage container 400 storing the bill has been printed on the sheet; the identification information had been printed by the printer 710. The fourth robot arm 700 places the grasped sheet on the top surface of the bill bundle MT in the storage unit 510. Subsequently, the sheet and the bill bundle MT are arranged together by the arranging mechanism 530a. More specifically, in the present embodiment, the bill bundle MT is arranged in the front-rear direction by the arranging mechanism 530, and the bill bundle MT may be arranged in the left-right direction by the fourth robot arm 700. In the present embodiment, the bill bundle MT is arranged in the upper right corner of the storage unit 510 by the above-described two operations.

Figure 9:
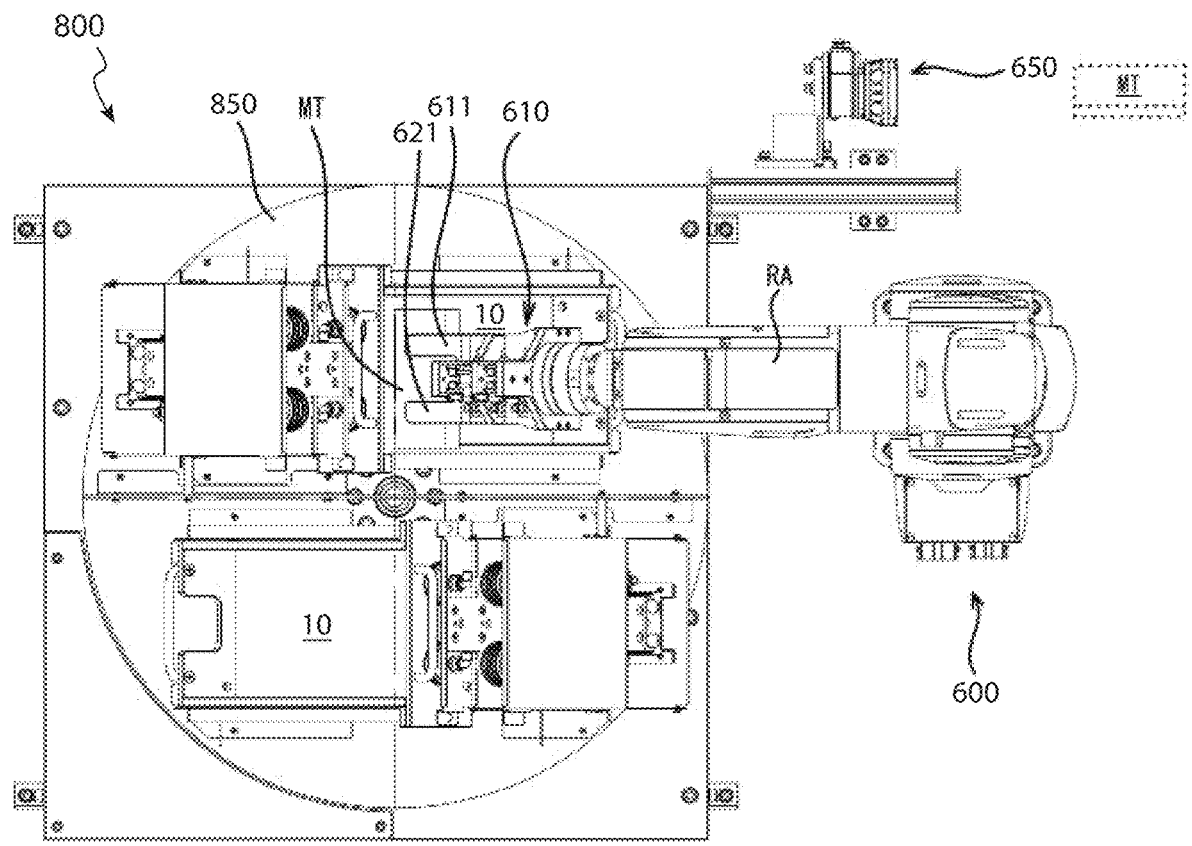
FIG. 9 shows a plan view of a case storage mechanism and a third robot arm.
Figure 10:
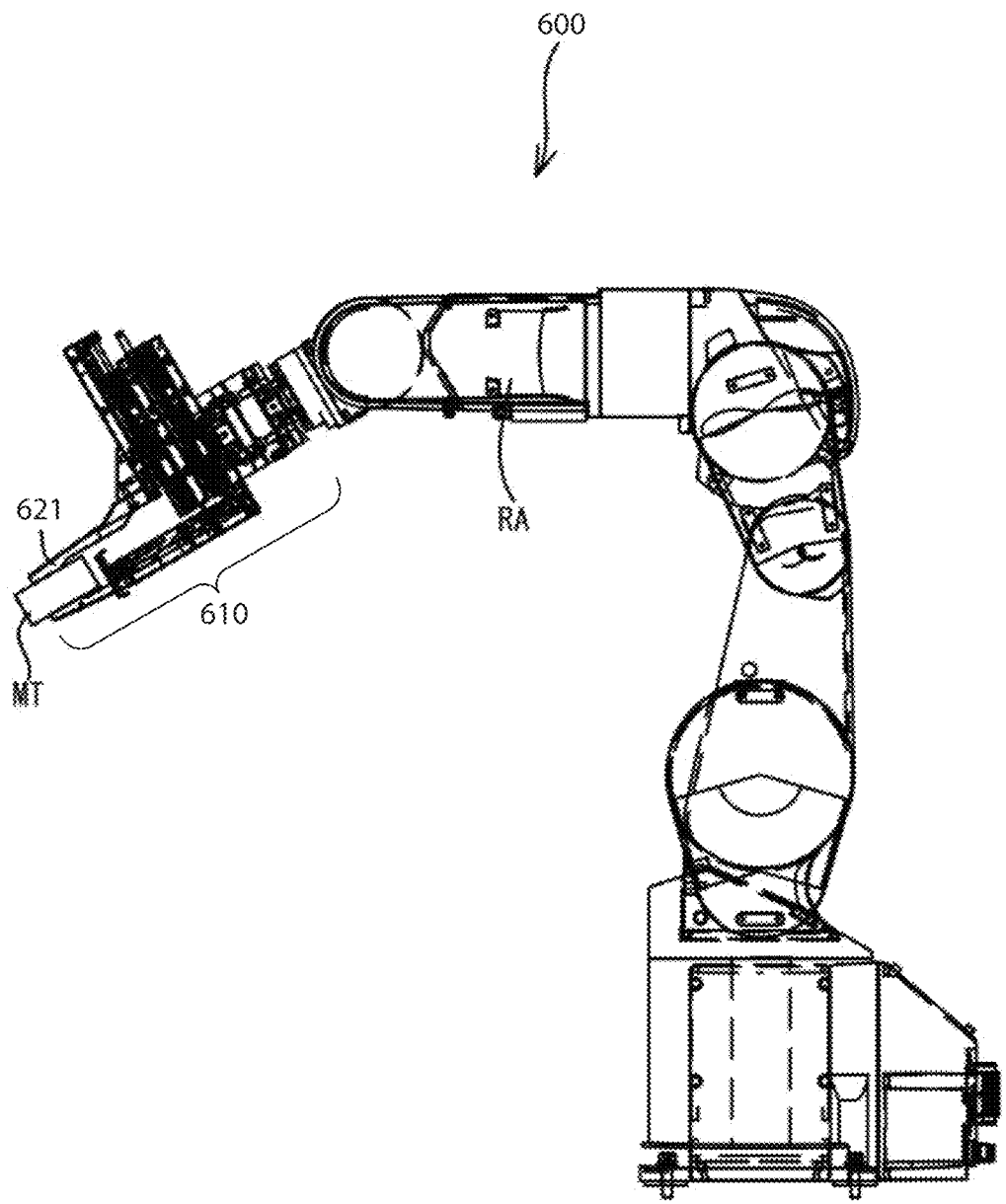
FIG. 10 shows a side view of a third robot arm.

FIG. 9 shows a plan view of a case storage mechanism 800 placed in proximity to the third robot arm 600. FIG. 10 shows a side view of the third robot arm 600. The third robot arm 600 may operate to move the bill bundle MT from the storage unit 510 into a bill storage case 10, as described further below.

The third robot arm 600 includes the alternate robot hand 610 and a robot arm section RA. As shown in FIG. 10, the alternate robot hand 610 (or just "robot hand 610" when context is clear) is a two-finger robot hand. The robot hand 610 is fixed to the end of the robot arm section RA. As shown in FIG. 10, the robot hand 610 includes a movable finger 621 and a fixed finger 622, which are configured to grasp the bill bundle MT. The third robot arm 600 may be operably controlled, such as by any of the first control device 900 or the second or third control devices 1000 and 1100, as described further below.

Figure 11:
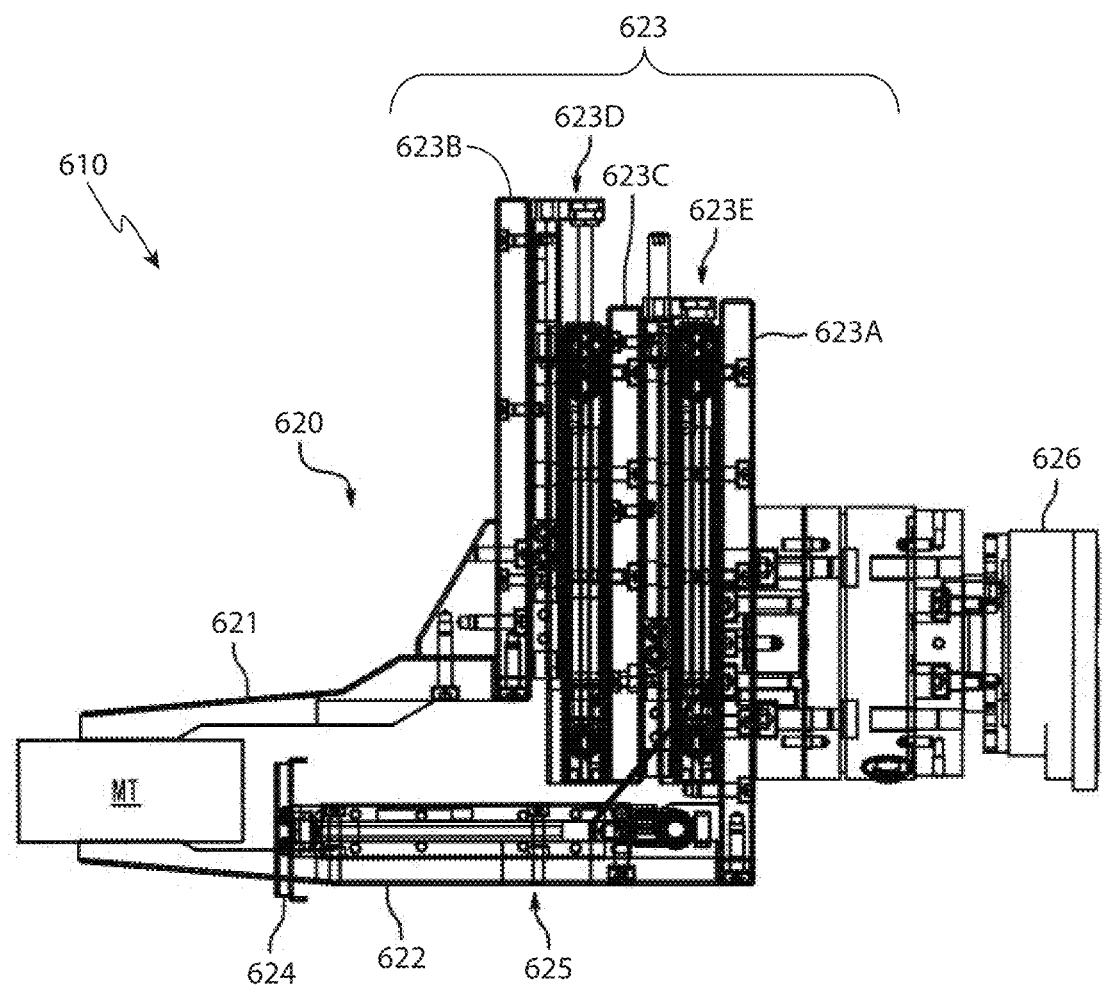
FIG. 11 shows a side view of a robot hand of a third robot arm.

FIG. 11 shows further details of the alternate robot hand 610. The robot hand 610 includes a movable finger 621, a fixed finger 622, a movable finger lifting mechanism 623, an extrusion portion 624, an extrusion portion reciprocating mechanism 625, and a connecting portion 626. The robot hand 610 may be communicatively connected to the first control device 900 of the automatic bill handling system 1, or to another control device.

The movable finger 621 is configured for gripping the bill bundle MT, and is a thick plate portion having a bifurcated shape in the present embodiment. The movable finger 621 faces a fixed finger 622, which will be described below and is substantially parallel to the fixed finger 622. The movable finger 621 is fixed to a front lifting plate 623B (as described below) of the movable finger lifting mechanism 623. A marker may be displayed on one side surface of the movable finger 621.

The fixed finger 622 is configured for gripping the bill bundle MT, and is a thick plate portion having a bifurcated shape similar to the movable finger 621 in the present embodiment. As described above, the fixed finger 622 faces the movable finger 621 and is substantially parallel to the movable finger 621. The fixed finger 622 is fixed to a support plate 623A (as described below) of the movable finger lifting mechanism 623. In the fixed finger 622, a marker may be displayed on the same side as the side where the marker display surface of the movable finger 621 is disposed. The markers displayed on one side surface of each of the fixed finger 622 and the movable finger 621 are aligned along a direction in which the movable finger 621 faces the fixed finger 622.

The movable finger lifting mechanism 623 is a two-stage stroke type lifting mechanism, and includes a support plate 623A, a front lifting plate 623B, a rear lifting plate 623C, a front air cylinder mechanism 623D, and a rear air cylinder mechanism 623E. The support plate 623A supports the rear air cylinder mechanism 623E. The rear air cylinder mechanism 623E operates in a double-acting manner, and is a driving source for raising and lowering the rear lifting plate 623C. The rear air cylinder mechanism 623E is attached to the support plate 623A as described above. The front air cylinder mechanism 623D is attached to the rear lifting plate 623C. The front air cylinder mechanism 623D operates in a double-acting manner and is a driving source for raising and lowering the front lifting plate 623B. As described above, the movable finger 621 is attached to the front lifting plate 623B. In other words, the rear air cylinder mechanism 623E raises and/or lowers the front air cylinder mechanism 623D, the front lifting plate 623B, and the movable finger 621 by raising and/or lowering the rear lifting plate 623C. In contrast, the front air cylinder mechanism 623D raises and/or lowers the movable finger 621 by raising and/or lowering the front lifting plate 623B. The front air cylinder mechanism 623D and the rear air cylinder mechanism 623E are each provided with an air supply/exhaust port (not shown). These air supply/exhaust ports are each connected to an air supply/exhaust pipe (not shown). The movable finger lifting mechanism 623 allows the fixed finger 622 and the movable finger 621 to grip the bill bundle MT and also to release the bill bundle MT.

Extrusion portion 624, which is a rectangular plate member, pushes out the bill bundle MT when the alternate robot hand 610 releases the bill bundle MT held by the alternate robot hand 610, and withdraws from a conveyance destination. This serves to reduce or prevent the alternate robot hand 610 from dragging the bill bundle MT as it withdraws. The extrusion portion 624 is fixed to the end of an extrusion portion reciprocating mechanism 625, which will be described further below. The extrusion portion 624 is reciprocated in a front-back direction by the extrusion portion reciprocating mechanism 625.

The extrusion portion reciprocating mechanism 625 is a mechanism for reciprocating the extrusion portion 624 in the front-back direction, and is fixed to the upper surface of the fixed finger 622. A reciprocating direction of the extrusion portion reciprocating mechanism 625 is parallel to an extending direction of the fixed finger 622. The extrusion portion reciprocating mechanism 625 may be an air cylinder mechanism or the like. The connecting portion 626 is a portion for connecting the alternate robot hand 610 to the robot arm section RA of the third robot arm 600, and is, for example, a flange or the like.

The imaging device 650 is, for example, a digital camera such as a CMOS, CCD or other type of camera or other optical imager, and is disposed to the lower left of the third robot arm 600, as shown in FIG. 9. The imaging device 650 may capture one or more images in sequence, and may be configured to capture video. As shown in FIG. 9, the imaging device 650 is disposed such that its imaging direction is directed away from the case storage mechanism 800. When a side surface of the alternate robot hand 610 on the marker display side enters an imaging area, the imaging device 650 images the side surface of the alternate robot hand 610 and then transmits the obtained image data to the first control device 900, or to the third control device 1100 (as described below). Note that in the present embodiment, the alternate robot hand 610 grips the bill bundle MT before the side surface of the alternate robot hand 610 on the marker display side enters the imaging area. In other words, when the imaging device 650 images the side surface of the alternate robot hand 610 on the marker display side, the bill bundle MT has been held by the alternate robot hand 610.

Figure 12:
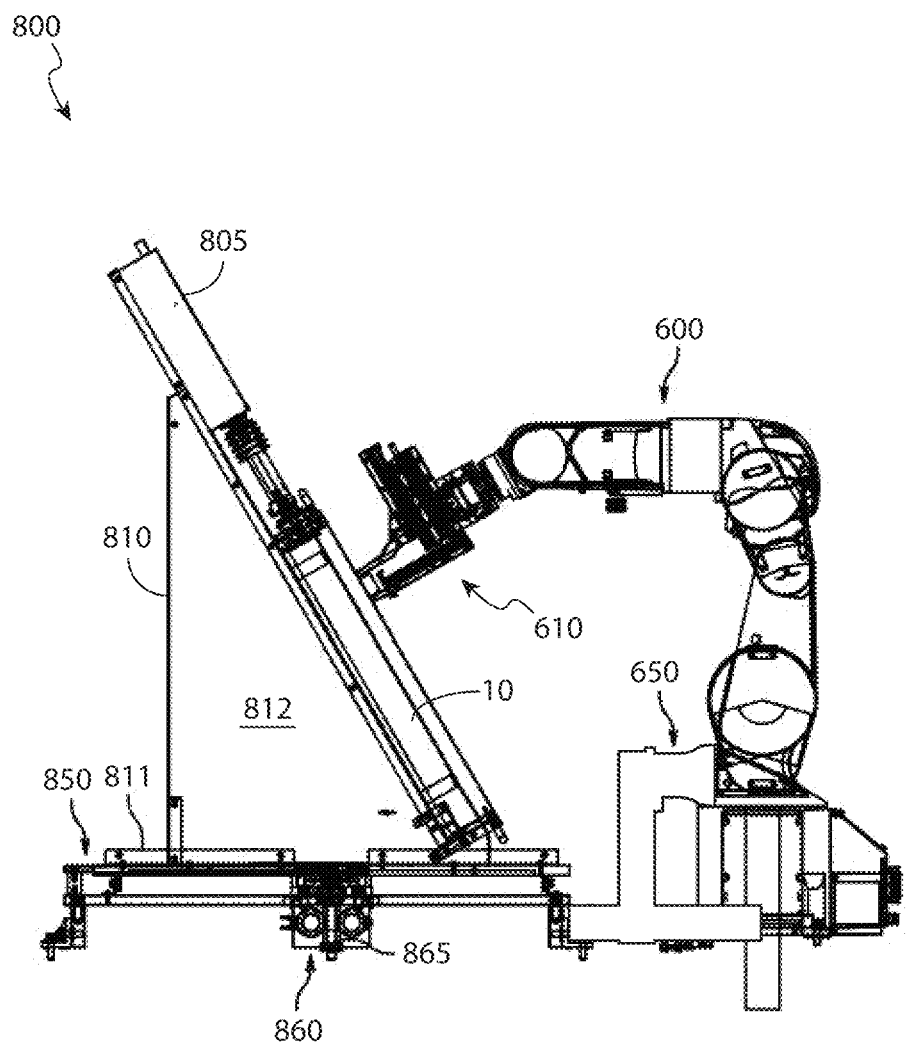
FIG. 12 shows a side view of a third robot arm interfacing with a case storage mechanism.

FIG. 12 shows a side view of both the third robot arm 600 and the case storage mechanism 800, as they might be configured on base 50 of the automatic bill handling system 1. The third robot arm 600 is shown in a position in which it would be inserting a bill bundle into bill storage case 10. The bill storage case 10 is mounted at an angle on a mounting table 810 of the case storage mechanism 800. Referring to the plan view of FIG. 9, the mounting table 810 is configured to hold two bill storage cases 10 arranged side by side so that the first bill storage case 10 (shown to the top in FIG. 9) faces toward the third robot arm 600, whereas the second bill storage case 10 faces away from the third robot arm 600.

The configuration of the bill storage case 10 will now be explained in reference to FIGS. 13A-13E. Thereafter, details regarding the structure of the case storage mechanism 800 will be explained in relation to FIGS. 14 and 15A-15C. Thereafter, various operations of the case storage mechanism 800 will be explained in relation to the control devices 900, 1000, and 1100 shown in FIGS. 17A, 18, and 19, respectively.

Figure 13A:
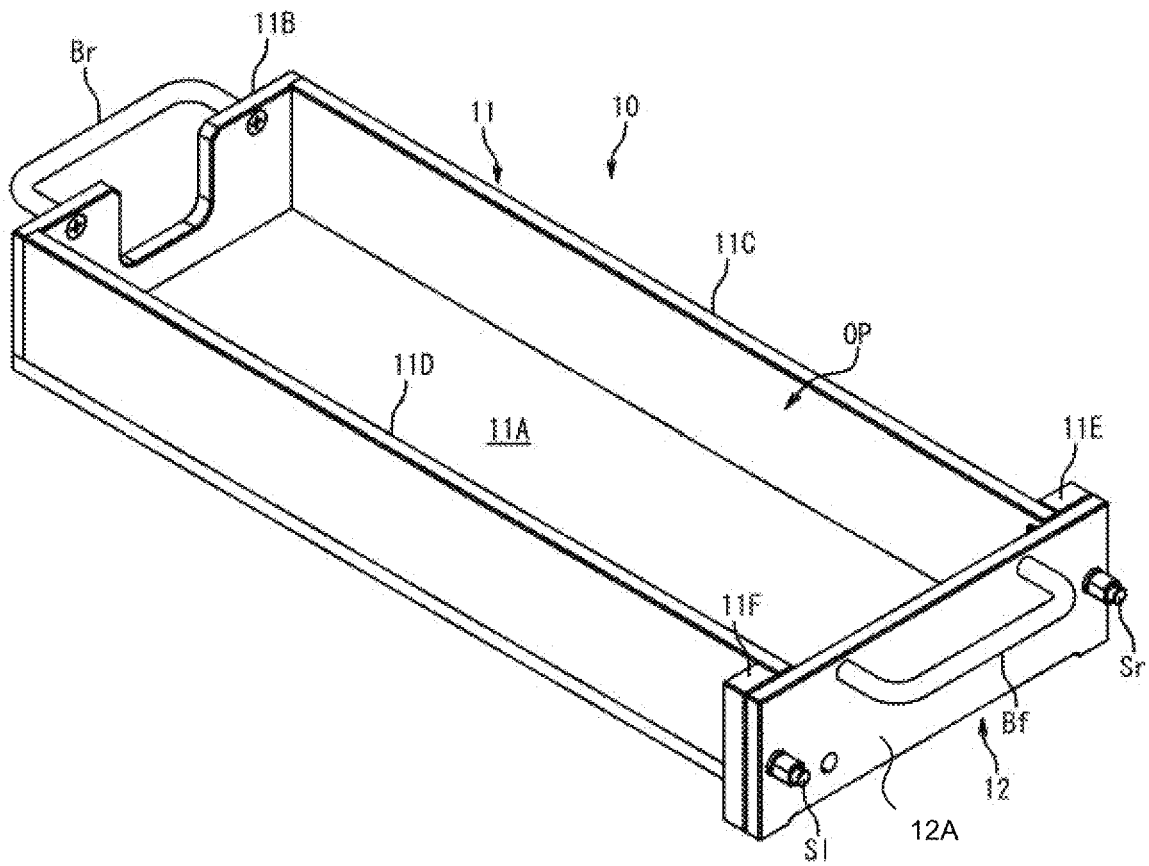
FIG. 13A shows a perspective view of a bill storage case.
Figure 13B:
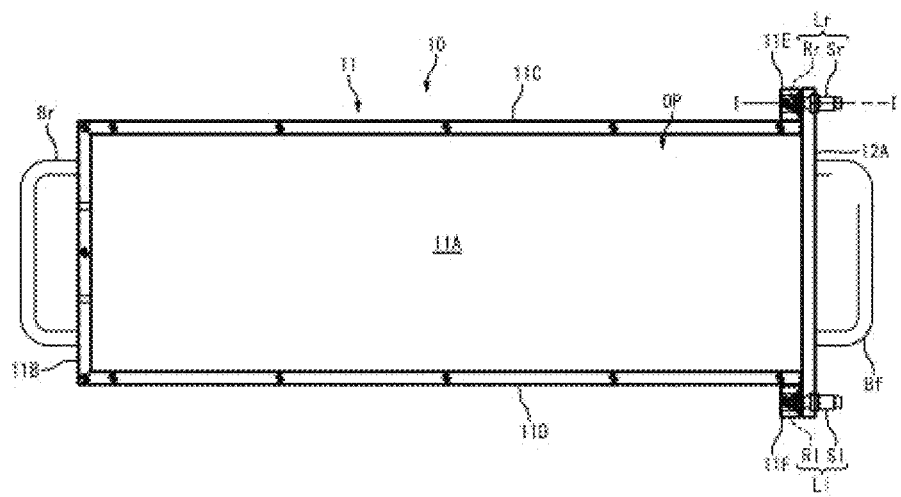
FIG. 13B shows a plan view of a bill storage case.
Figure 13C:
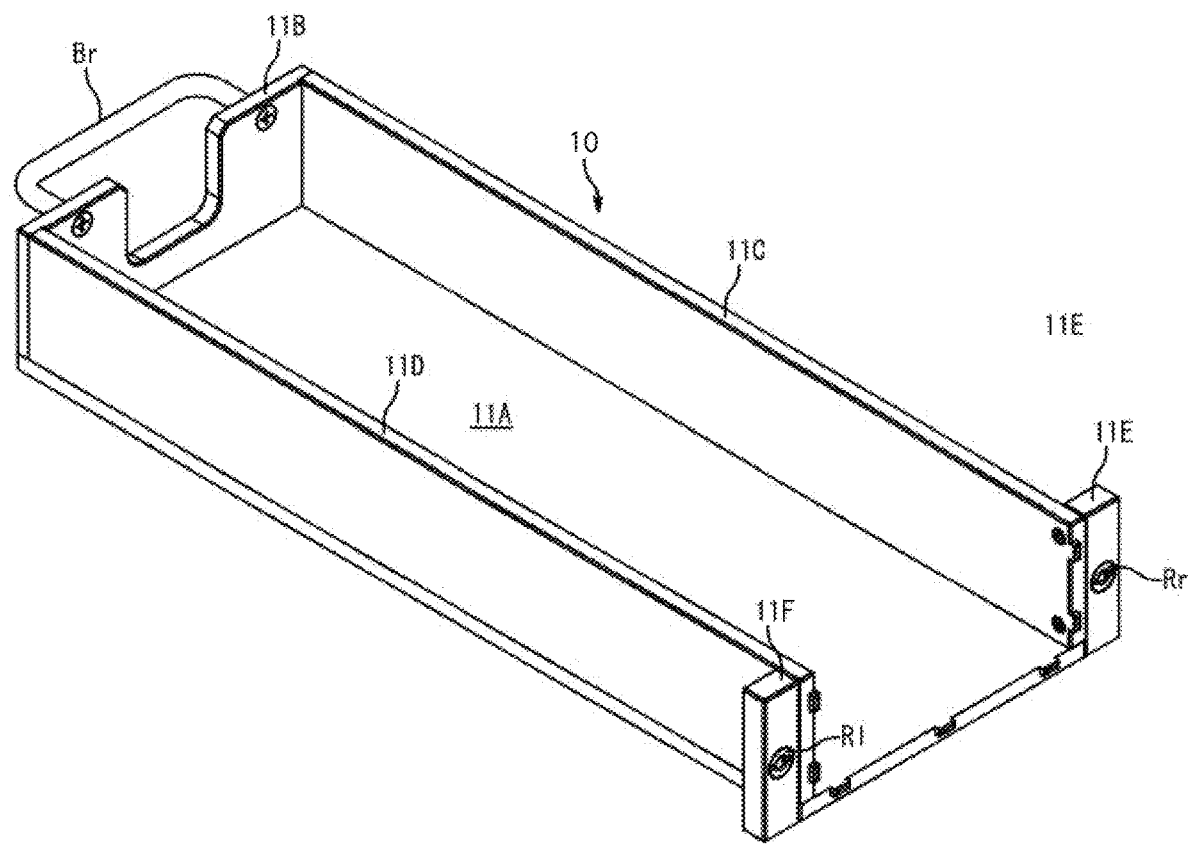
FIG. 13C shows a perspective view of a bill storage case with a front wall removed.

The bill storage case 10 has an opening OP in the top surface, partial box unit 11 that includes the side walls: bottom 11A, and sides 11B, 11C, 11D, and 11E. The bill storage case 10 includes the detachable front wall unit 12. The bill storage case 10 includes a right flange portion 11E, a left flange portion 11F, a rear handle Br, a right side receiving portion Rr, and a left side receiving portion Rl. The bottom wall portion 11A is a rectangular portion that constitutes the bottom wall of the bill storage case 10. The back wall portion 11B is a portion constituting the back wall of the bill storage case 10, and extends upward from the rear end of the bottom wall portion 11A as shown in FIGS. 5 and 6. As shown in FIG. 13A, the back wall portion 11B has a concave shape in which the upper center is cut off. The right side wall portion 11C is a rectangular portion constituting the right side wall of the bill storage case 10, and extends upward from the right end of the bottom wall portion 11A as shown in FIGS. 13A-13C. The left side wall portion 11D is a rectangular portion constituting the left side wall of the bill storage case 10, and extends upward from the left end of the bottom wall portion 11A as shown in FIGS. 13A-13C. The right flange portion 11E is a rectangular portion for supporting the right side receiving portion Rr therein, and is attached to the outside of the front end portion of the right side wall portion 11C. The left flange portion 11F is a rectangular portion for supporting the left side receiving portion Rl therein, and is attached to the outside of the front end portion of the left side wall portion 11D. The rear handle Br is attached to the upper end portion of the outer surface of the back wall portion 11B. The right receiving portion Rr is a cylindrical portion for receiving a right lock pin Sr, which will be described later, and is embedded in the right flange portion 11E so that the axis of the cylindrical portion extends along the front-back direction. The left-side receiving portion Rl is a cylindrical portion for receiving a left-side lock pin Sl, which will be described later, and is embedded in the left flange portion 11F so that the axis of the cylindrical portion extends along the front-back direction. Note that the symbol Lr shown in FIG. 13B indicates a right lock mechanism, and the right lock mechanism is composed of a right receiving portion Rr and a right lock pin Sr. Likewise, the symbol Ll shown in FIG. 13B indicates a left side lock mechanism, and the left side lock mechanism is composed of the left-side receiving portion Rl and the left-side lock pin Sl.

Figure 13D:
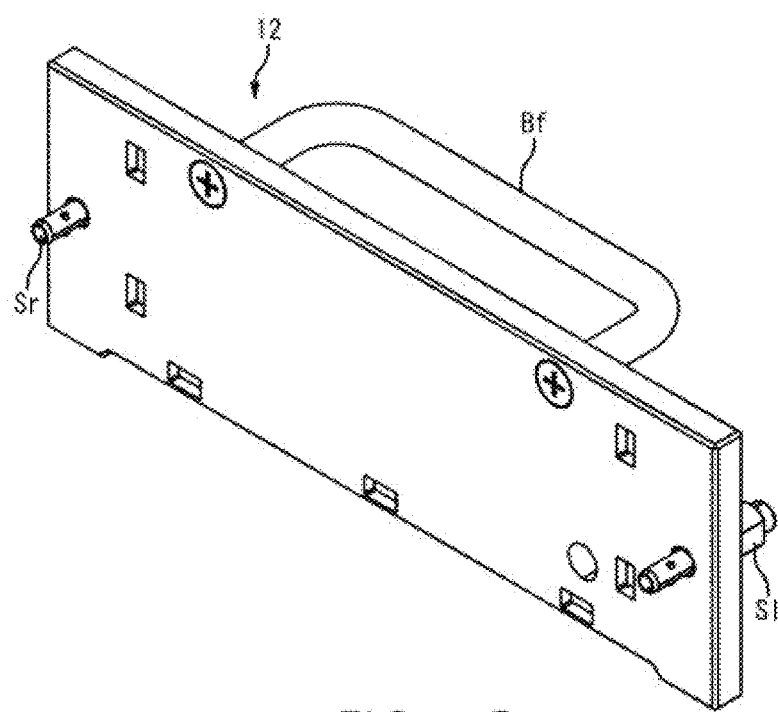
FIG. 13D shows a perspective view of a front wall of a bill storage case.

As shown in FIG. 13D, the front wall unit 12 is formed of the front wall portion 12A, a front handle Bf, the right lock pin Sr, and the left lock pin Sl. The front wall portion 12A is literally a rectangular portion that constitutes the front wall of the bill storage case 10. Note that the width of the front wall portion 12A is the same as the length from the right end of the right flange portion 11E to the left end of the left flange portion 11F. The front handle Bf is attached to the upper end portion of the outer surface of the front wall portion 12. The right lock pin Sr is a ball lock pin type lock pin in which pushing its tip allows a ball disposed at the rear end portion to be inserted, and is fixed to the right center portion of the front wall portion 12A so as to penetrate the right center portion of the front wall portion 12A as shown in FIG. 13D. Like the right lock pin Sr, the left lock pin Sl is a ball lock pin type lock pin in which pushing its tip allows a ball disposed at the rear end portion to be inserted, and is fixed to the left center portion of the front wall portion 12A so as to penetrate the left center portion of the front wall portion 12A.

Figure 13E:
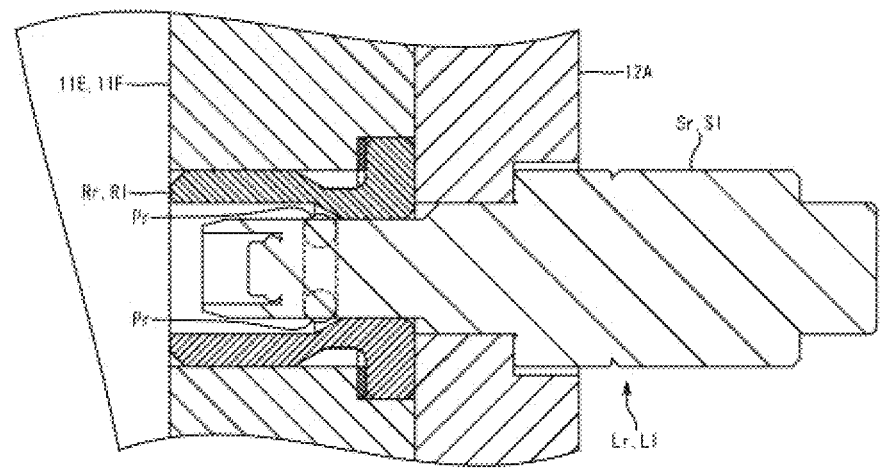
FIG. 13E shows a cutaway view of a lock pin of a front wall of a bill storage case.

The lock mechanisms Lr and Ll may be a ball lock type lock mechanisms, as now described, or may be another removable type locking mechanism. When a piston is pushed in the lock pins Sr and Sl against the urging force, the projecting portions (balls) Pr disposed on the opposite side become a state in which they can be inserted radially inward. This allows the lock pins Sr and Sl to be pulled out from the receiving portions Rr and Rl, as shown in FIG. 13E. In contrast, when the piston is pushed back by the urging force, the projecting portions (balls) Pr protrude radially outward and the projecting portions Pr are locked (i.e., a state in which the projecting portions (balls) Pr cannot be inserted radially inward is achieved). This disables the lock pins Sr and Sl from being pulled out from the receiving portions Rr and Rl.

FIGS. 14 and 15A-15C illustrate how the bill storage case 10 may be positioned on the case storage mechanism 800. The case storage mechanism 800 includes the mounting table 810 that is an inclined table having a substantially right-angled triangular shape in the side view of FIG. 12, and is formed with pedestal portions on the circular table 811 and a main body portion 812. The main body portion 812 is disposed on the upper side of the pedestal portions on the circular table 811. The inclined surface of the main body portion 812 is used as a mounting surface for mounting the bill storage case 10. The bill storage case 10 is detachably mounted on the mounting surface of the main body portion 812 such that the front wall unit 12 (described above) of the bill storage case 10 is positioned above the mounting table 810.

Figure 14:
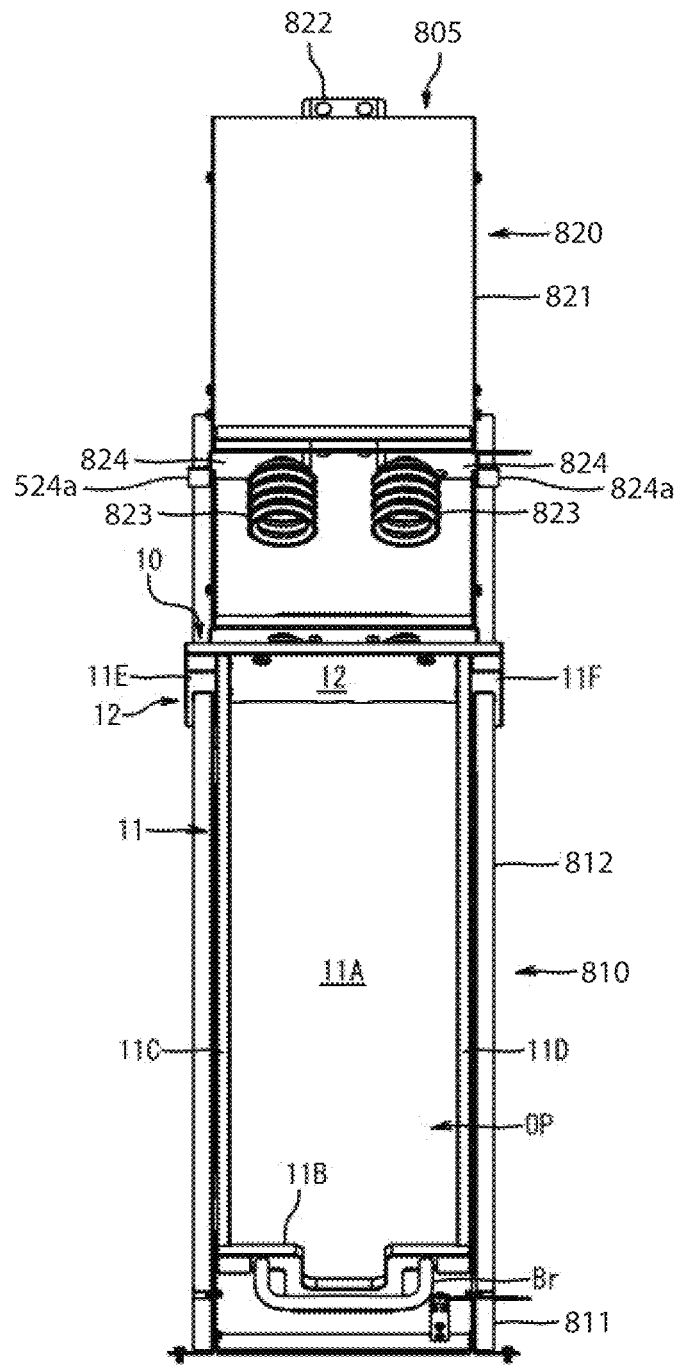
FIG. 14 shows a first side view of a bill storage case mounted on a case storage mechanism.

The case storage mechanism 800 includes the suction mechanism 820, which is a vacuum chuck mechanism or the like for chucking the front wall unit 12 of the bill storage case 10, and includes a housing 821, a guide rail 822, a slide bar (not shown), a reciprocating mechanism (not shown), an air supply/exhaust device (not shown), a bellows chuck 823, and a support plate 824, as shown in FIG. 14. The main part of the guide rail 822, the slide bar, and the reciprocating mechanism are accommodated in the housing 821. The guide rail 822 is a member for guiding the slide bar, and is disposed along a direction parallel to the inclined surface of the mounting table 810. The slide bar is a rod-shaped member movable along the guide rail 822, and is attached to the reciprocating mechanism. In other words, the slide bar is moved along the guide rail 822 by the reciprocating mechanism. Examples of the reciprocating mechanism include an air cylinder mechanism, a rack and pinion mechanism, a ball screw mechanism, a motor cylinder mechanism, an electric slider mechanism, a belt slider mechanism, and a linear slider mechanism. Examples of the driving source include air pressure and an electric motor. The bellows chuck 823 is a member in contact with an object to be adsorbed; the bellows chuck 823 is supported by the support plate 824, and is pipe-connected to the air supply/exhaust device. When the bellows chuck 823 contacts the object to be sucked and contracts, the air supply/exhaust device exhausts the air in the bellows chuck 823, thereby adsorbing the object to be sucked. In contrast, when releasing the object to be sucked from the bellows chuck 823, the air supply/exhaust device supplies air into the bellows chuck 823. The support plate 824 is disposed on both sides of the lower end of the slide bar as shown to support the bellows chuck 823. As shown in FIG. 10, a contact plate 424a is jointed to the outside of the support plate 824. The contact plate 824a is provided for the purpose of releasing a lock state of lock mechanisms Lr and Ll (described above) of the bill storage case 10.

Figure 17A:
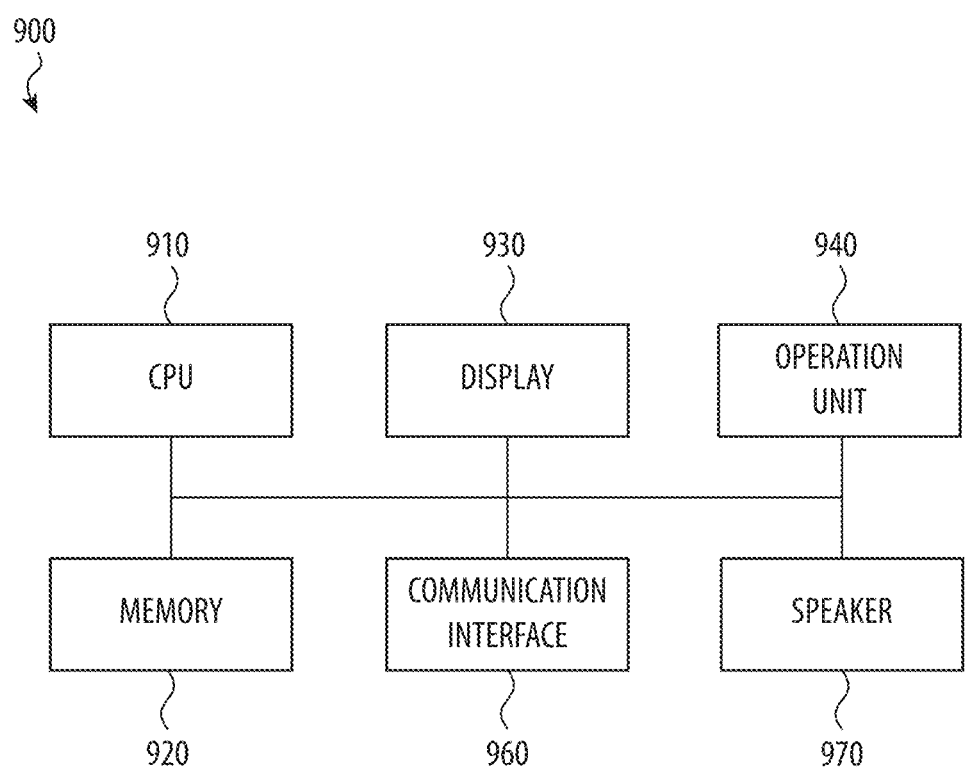
FIG. 17A shows a block diagram of a first control device.
Figure 18:
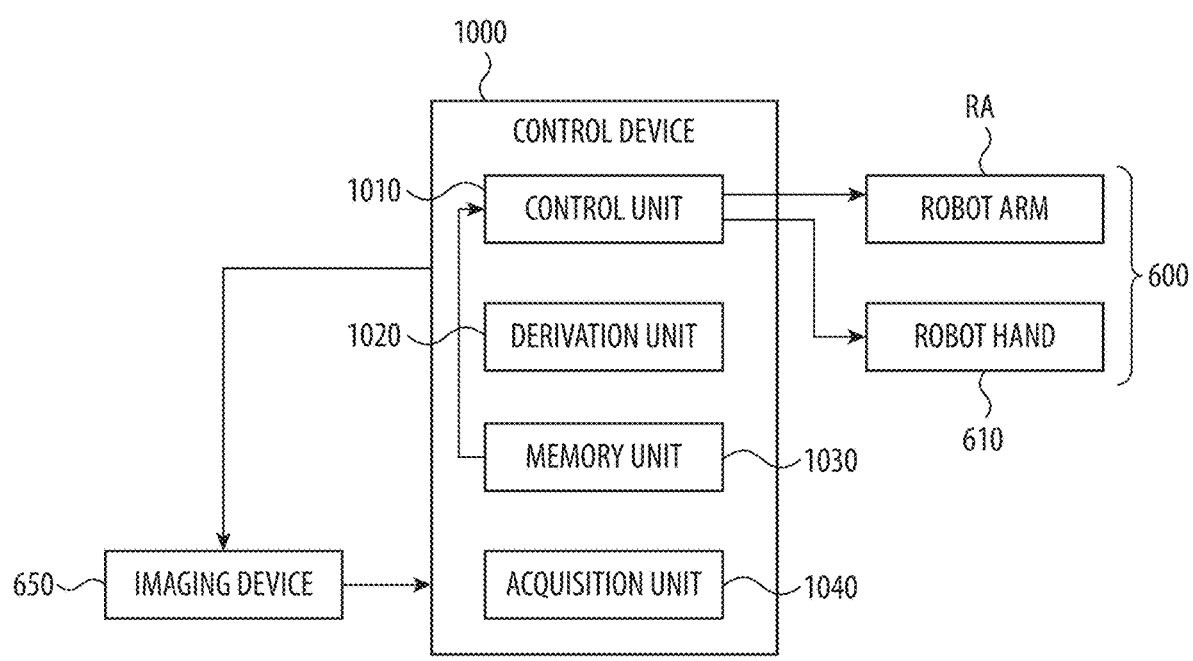
FIG. 18 shows a block diagram of a second control device.
Figure 19:
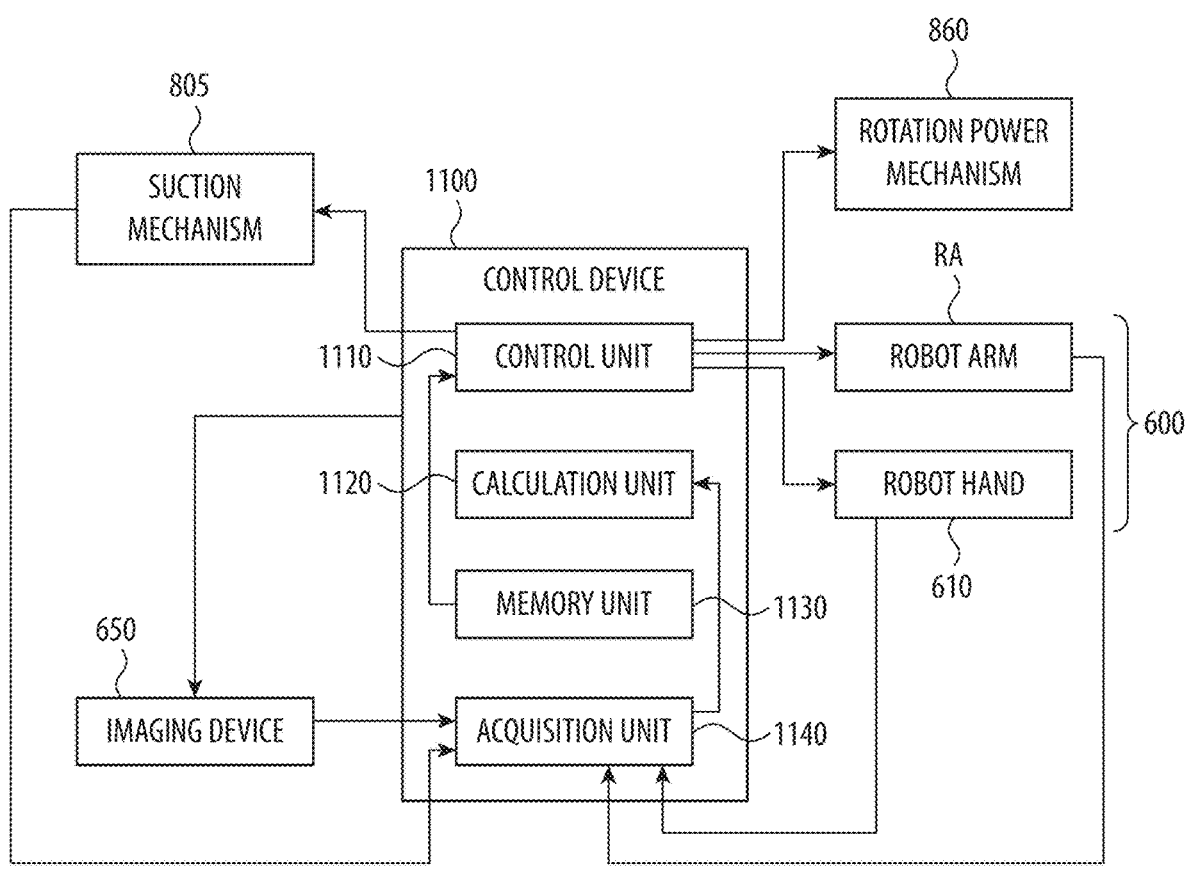
FIG. 19 shows a block diagram of a third control device.

The suction mechanism 820 is communicatively connected to a control unit, such as of one of the control devices 900, 1000, or 1100 as respectively shown in FIGS. 17A, 18, and 19. In the suction mechanism 820, the reciprocating mechanism and the air supply/exhaust device are to be controlled by the control device.

Figure 15A:
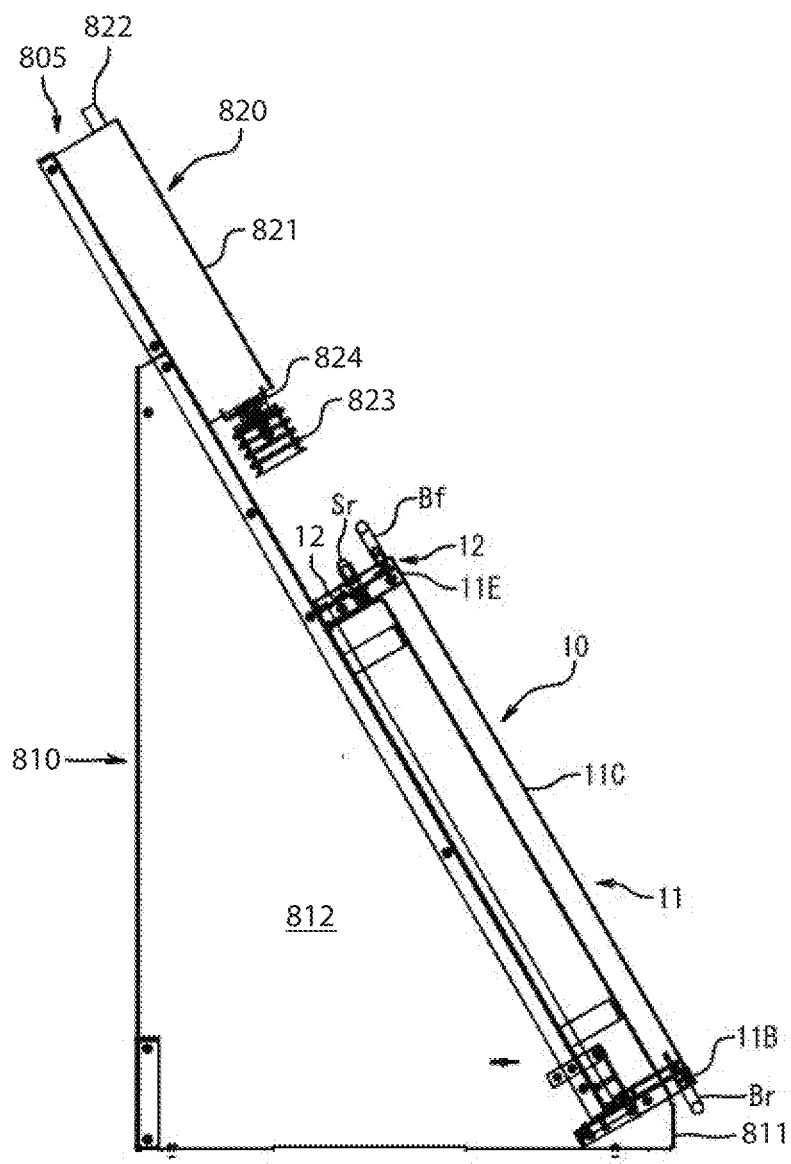
FIG. 15A shows a second side view of a bill storage case mounted on a case storage mechanism.
Figure 15B:
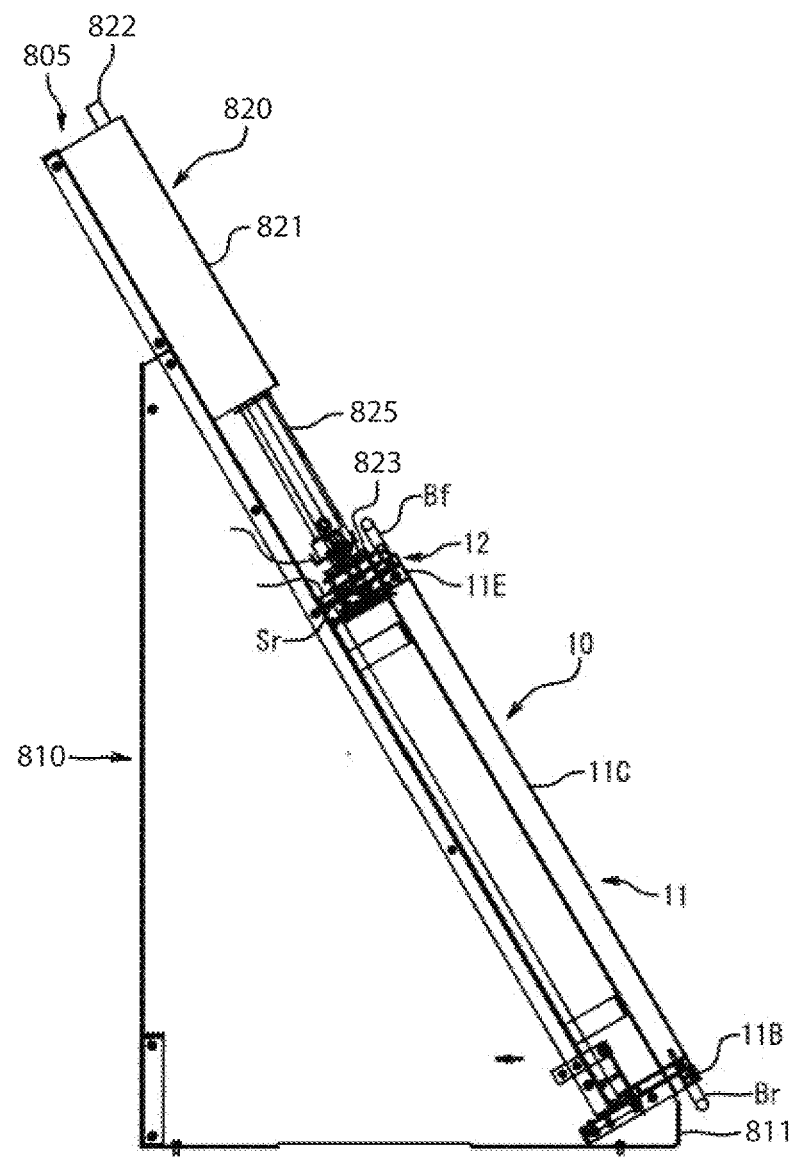
FIG. 15B shows a second side view of a bill storage case mounted on a case storage mechanism, with a slide bar extended.
Figure 15C:
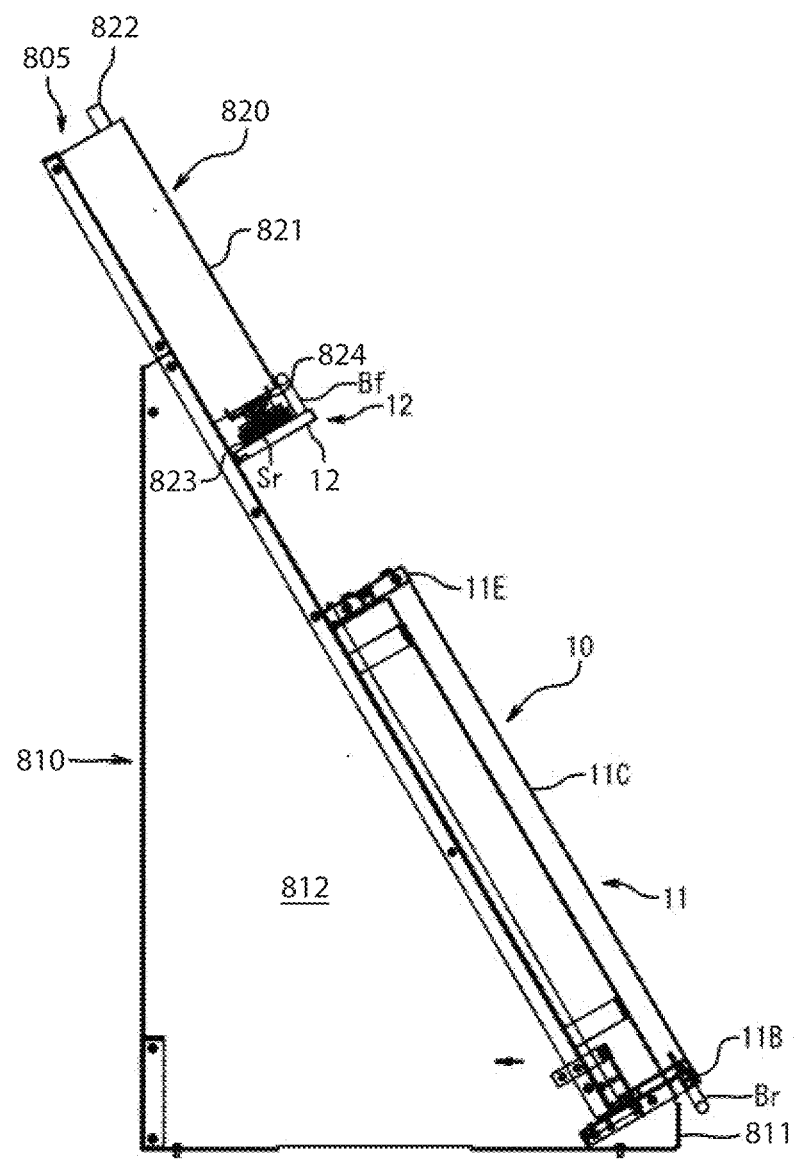
FIG. 15C shows a second side view of a bill storage case mounted on a case storage mechanism, with a slide bar retracted.

The suction mechanism 820 is in a state shown in FIGS. 9 and 15A during standby; that is, it is in a state in which the bellows chuck 823 has been pulled upward. When the suction mechanism 820 receives an operation start signal from the control unit 1110 of the third control device 1100, the suction mechanism 820 lowers the slide bar as shown in FIG. 15b, thereby causing the bellows chuck 823 to be in contact with the front wall unit 12 of the bill storage case 10 that is an object to be sucked in the present embodiment; furthermore, the suction mechanism 820 presses the bellows chuck 823 against the front wall unit 12, while maintaining the contact state, to contract the bellows chuck 823. At this time, the air supply/exhaust device of the suction mechanism 820 discharges the air in the bellows chuck 823 to the outside, thereby sucking the front wall unit 12 to the bellows chuck 823. At the same time, the contact plate 824a of the support plate 824 pushes the right lock pin Sr and the left lock pin Sl of the bill storage case 10 into the front wall unit 12 to release a locked state of the lock mechanisms Lr and Ll and maintain its unlocked state. Subsequently, the suction mechanism 820 raises the slide bar while maintaining the unlocked state of the lock mechanisms Lr and Ll of the bill storage case 10 by the contact plate 824a, and pulls the front wall unit 12 upward.

In contrast, in reconfiguring the wall unit 12 onto the bill storage case 10, the suction mechanism 820 lowers the slide bar to bring the front wall unit 12 into contact with the partial box unit 11. Next, supplying air from the air supply/exhaust device into the bellows chuck 823 causes the bellows chuck 823 to release the front wall unit 12. Subsequently, the suction mechanism 820 raises the slide bar and returns to a standby state. When the slide bar is pulled up, the right lock pin Sr and the left lock pin Sl of the bill storage case 10 return to the locked state by urging force, and the front wall unit 12 is locked with respect to the partial box unit 11. The reconfiguration of the bill storage case 10 is performed after the above-described operation start signal is received and then the front wall unit 12 is pulled upward.

The case storage mechanism 800 includes the turntable 850. The turntable 850 includes a rotation power mechanism 860 and a circular table 811. The rotation power mechanism 860 is a power source such as an air cylinder or a stepping motor, and a shaft 865 extends along a rotational axis thereof. An upper end portion of the shaft 865 is fitted to a center portion of the circular table 811. The rotation power mechanism 860 of the turntable 850 is communicatively connected to the control unit of the third control device 1100 as shown in FIG. 19. The circular table 811 is a circular thick plate member. As described above, the turntable 850 is fitted to the upper end portion of the shaft 865 at the center portion thereof. As shown in FIG. 14, a pair of wall attaching/detaching devices 805 are mounted (fixed) on the circular table 811 such that the pair of wall attaching/detaching devices 805 are directed in directions opposite to each other.

Three embodiments of control devices 900, 1000, and 1100 will now be described in relation to FIGS. 17A-17D, 18, and 19. The control devices may be used to control, either separately or in unison, the various components of the automatic bill handling system 1.

The first control device 900 includes a CPU 910, a memory 920, a display unit 930, an operation unit 940, a communication interface 960, a speaker 970, and may include other subunits. The CPU 910 may control each or some of the components of the automatic bill handling system 1, in accordance with programs stored in the memory 920.

The second control device 1000 shown in the block diagram of FIG. 18 includes a control unit 1010, a derivation unit 1020, a memory unit 1030, and an acquisition unit 1040. These components will be described in further detail below. The second control device 1000 may be used to control the third robot arm 600.

The third control device 1100 shown in the block diagram of FIG. 19 includes a control unit 1110, a calculation unit 1120, a memory unit 1130, and an acquisition unit 1140. These components will be described in detail below in relation to their operations. The third control device 1100 may be communicatively linked with the suction mechanism 820, the imaging device 650, and the robot arm section RA and the alternate robot hand 610 of the third robot arm 600.

Returning now to the first control device 900, in one method the CPU 910 receives an instruction from the operation unit 940, and/or displays an operation status of the automatic bill handling system 1 on the display unit 930. The CPU 910 acquires data from each unit of the automatic bill handling system 1 via the communication interface 960, and may control one or more components of the automatic bill handling system 1.

For example, the memory 920 stores container type data 921 as shown in FIG. 17B. The container type data 921 stores, for each type of the bill storage container, a size of the bill storage container, a position of the key hole, an angle of the key hole, a type of the key, and the like. The memory 920 may also store individual container data 922 as shown in FIG. 17C. For each bill storage container, identification information, a type of the bill storage container, data for a device that has been set, data for the date and time when the bill was collected last time, and the like are stored in the individual container data 922 stores.

As a result, the CPU 910 identifies the type of the bill storage container 400 to be targeted by referring to the individual container data 922 based on the information received from the box sensor 150, and/or identifies the position and angle of the key hole by referring to the container type data 921. The CPU 910 then transmits the position and angle of the key hole to the first robot arm 200 via the communication interface 960.

In addition, based on the data from the imaging device 650 of the third robot arm 600, the CPU 910 may calculate the thickness of the bill bundle MT grasped this time, stores the thickness of the accumulated bills in the memory 920, and/or rotates the turntable 850 when a predetermined quantity of bills accumulates in the case CA.

The first control device 900 of FIG. 17A measures the thickness of the bill bundles MT from the distance between the markers of the movable finger 621 and the fixed finger 622 of the robot hand 610 of the third robot arm 600 based on image data sent from the imaging device 650. The first control device 900 measures the thickness of the bundle of bills MT by analyzing and calculating the distance between the markers when the robot hand 610 grasps the bundle of bills MT from the image data. The first control device 900 derives the conveying speed and the swirling radius of the bundle of bills MT according to the thickness data of the bundle of bills MT (hereinafter referred to as "thickness data"). For example, the first control device 900 may compare the thickness data with the control table stored in a memory, which will be described later, to derive the conveying speed and the swirling radius corresponding to the thickness data, or may substitute the thickness data into a calculation formula for calculating the conveying speed from the thickness data and a calculation formula for calculating the swirling radius from the thickness data to derive the conveying speed and the swirling radius corresponding to the thickness data. Then, the first control device 900 transmits the data of the conveying speed and the swirling radius of the bundle of bills MT to the third robot arm 600. Controlling the conveying speed and the swirling radius of the bundle of bills MT controls the conveying speed and the swirling radius of the alternate robot hand 610.

In another method that may be controlled by the first control device 900, the first control device 900 may control operations of unlocking the bill storage container 400 by controlling the first robot arm 200. The first robot arm 200 may have a plurality of types of keys corresponding to a type of the bill storage container 400. The front lid 420 may be unlocked by a key corresponding to the bill storage container 400 by detection by the box sensor 150.

More specifically, the memory 920 of the first control device 900 stores key data 923 as shown in FIG. 17D. For each type of key, identification information, a correction value for the position of the key with respect to the position of a key serving as a reference, a correction value for the angle of the key with respect to the angle of a key serving as a reference, and a size, that is, a width, a height, a depth, and the like of the key are stored in the key data 923.

As a result, based on the data received from the box sensor 150, the CPU 910 identifies the type of the bill storage container 400 to be targeted by referring to the individual container data 922, identifies the position and angle of the key hole by referring to the container type data 921, and identifies the type of the key and various corrected values corresponding to the bill storage container 400. The CPU 910 then transmits the position, angle, key type, and/or corrected values of the key hole to the first robot arm 200 via the communication interface 960. As a result, the first robot arm 200 unlocks the key specified in the key hole of the bill storage container 400 by inserting the key while correcting the position and the angle using the corrected values.

Now will be described a method of operating the third robot arm 600 that may be controlled by the second control device 1000 of FIG. 18. The second control device 1000 may be connected to each of the robot arm section RA of the third robot arm 600, the alternate robot hand 610, and the imaging device 650. The control unit 1010 controls the operations of the robot arm section RA and the alternate robot hand 610, and the processing of image data from the imaging device 650 by transmitting various control signals to the robot arm RA, the alternate robot hand 610, and the imaging device 650. The control unit 1010 transmits control signals to the robot arm RA, the robot hand 610, and the imaging device 650 in accordance with instructions described in a control program stored in the memory unit 1030. In addition, the control unit 1010 reads out data necessary for generating a control signal from at least one of the derivation unit 1020 and the memory unit 1030, generates a control signal from the data, and transmits the control signal to the robot arm section RA, the robot hand 610, and the imaging device 650.

The derivation unit 1020 is, for example, a processing device of a central processing unit of a computer or the like, and generates data necessary for generating a control signal from data stored in the memory unit 1030 and data transmitted from the acquisition unit 1040, and supplies the data to the control unit 1010. For example, the derivation unit 1020 measures the thickness of the bundle of bills MT from the distance between the markers of the movable finger 621 and the fixed finger 622 of the alternate robot hand 610 based on the image data sent from the imaging device 650 via the acquisition unit 1040. The derivation unit 1020 measures the thickness of the bundle of bills MT by analyzing and calculating the distance between the markers when the robot hand 610 grasps the bundle of bills MT based on the image data. The derivation unit 1020 derives the conveying speed and the swirling radius of the bundle of bills MT according to the thickness data of the bundle of bills MT (hereinafter referred to as "thickness data"). For example, the derivation unit 1020 may compare the thickness data with the control table stored in the memory unit 1030 to derive the conveying speed and the swirling radius corresponding to the thickness data, or may substitute the thickness data into a calculation formula for calculating the conveying speed from the thickness data and a calculation formula for calculating the swirling radius from the thickness data to derive the conveying speed and the swirling radius corresponding to the thickness data. Then, the derivation unit 1020 transmits the data of the conveying speed and the swirling radius of the bundle of bills MT to the control unit 1010. Controlling the conveying speed and the swirling radius of the bundle of bills MT controls the conveying speed and the swirling radius of the alternate robot hand 610.

The memory unit 1030 may store one or more control programs, control parameters, control tables, or the like. The acquisition unit 1040 is, for example, a communication interface of a computer or the like, and has a function of receiving the image data obtained by the imaging device 650 and transmitting it to the derivation unit 1020.

Next, in a first method that may be controlled by the third control device 1100, the third control device 1100 controls operations of the third robot arm 600. First, the third control device 1100 controls the robot arm RA to move the alternate robot hand 610 to a position where the alternate robot hand 610 is waiting at a predetermined position can grasp the bundle of bills MT (see a broken line in FIG. 9). Then, the third control device 1100 controls the movable finger 621 of the robot hand 110 to move the movable finger 621 of the robot hand 610, which has been pulled upward in advance, downward to grasp the bundle of bills MT together with the fixed finger 622. In this embodiment, the bundle of bills MT may be prepared in advance so that the robot hand 610 can more easily grasp the bundle of bills MT.

Next, in a state where the robot hand 610 grasps the bundle of bills MT, the imaging device 650 obtains image data of the side surfaces of the movable finger 621 and the fixed finger 622 of the robot hand 610 so as to fit in one image. The imaging device 650 transmits the image data to the acquisition unit 1140 of the third control device 1100. A series of these processes are performed between the time when the robot hand 610 grasps the bundle of bills MT and the time when the third robot arm 600 starts conveying the bundle of bills MT.

Subsequently, the third control device 1100 receives the image data transmitted from the imaging device 650, and transmits the image data to the acquisition unit 1140 of the third control device 1100. The third control device 1100 measures or estimates the thickness of the bundle of bills MT, such as in the calculation unit 1120, based on the positional relationship between the movable finger 621 and the fixed finger 622 of the robot hand 610 inferred from the image data. Then, the third control device 1100 derives the conveying speed and the swirling radius of the bundle of bills MT corresponding to the thickness data, and transmits the data of the conveying speed and the swirling radius of the bundle of bills MT to the control unit of the third robot arm 600. A series of these processes is also performed between the time when the robot hand 610 grasps the bundle of bills MT and the time when the third robot arm 600 starts conveying the bundle of bills MT. Then, the third robot arm 600 executes the control described below using the derived conveying speed and swirling radius of the bundle of bills MT.

The third control device 1100 controls the conveying speed and the swirling radius of the bundle of bills MT by using the derived data of the conveying speed and the swirling radius of the bundle of bills MT. For example, as the thickness of the bundle of bills MT increases, the third control device 1100 decreases the conveying speed of the bundle of bills MT and shorten the swirling radius of the bundle of bills MT. In addition, as the thickness of the bundle of bills MT decreases, the third control device 1100 increases the conveying speed of the bundle of bills MT and lengthens the swirling radius of the bundle of bills MT. However, the third control device 1100 controls the conveying speed and the swirling radius of the bundle of bills MT within the ranges of the maximum value and the minimum value set for the conveying speed and the swirling radius of the bundle of bills MT, respectively. Then, the third control device 1100 controls the robot arm RA to convey the bundle of bills MT to the case CA as the conveying destination. The third control device 1100 controls the robot arm RA so that the bundle of bills MT are sequentially stacked in the bill storage case 10.

Subsequently, the third control device 1100 controls the robot arm RA to insert the movable finger 621 and the fixed finger 622 of the alternate robot hand 610 into the back side of the bill storage case 10. Then, the third control device 1100 controls the movable finger 621 to move up the movable finger 621, to release the grasping state, and to release the bundle of bills MT. Then, the third control device 1100 controls the robot arm RA to retract the robot hand 610 from the bill storage case 10 while maintaining the inclination angle of the alternate robot hand 610. Finally, the third control device 1100 controls the robot arm RA to move the alternate robot hand 610 to a predetermined position in preparation for the conveyance of the next bundle of bills MT.

In another method that may be controlled by the third control device 1100, the third robot arm 600 and the case storage mechanism 800 are controlled by the third control device 1100 to move bill bundles MT into a bill storage case 10, and control the amount, size, or number of bill bundles MT moved into the bill storage case 10.

The control unit 1110 of the third control device 1100 transmits various control signals to the third robot arm 600, the alternate robot hand 610, the imaging device 650, the suction mechanism 820, and the rotation power mechanism 860, thereby controlling an operation of the third robot arm 600, an operation of the alternate robot hand 610, an imaging process of the imaging device 650, an operation of the suction mechanism 820, and an operation of the rotation power mechanism 860. Note that the control unit 1110 may transmit control signals to these, and possibly other components, in accordance with instructions described in a control program stored in the memory unit 1130.

After the alternate robot hand 610 grips the bill bundle MT, the control unit 1110 controls the third robot arm 600 to move the alternate robot hand 610 to an imaging point of the imaging device 650. After receiving an operation completion signal from the third robot arm 600, the control unit 1110 transmits an imaging process execution signal to the imaging device 650. The imaging device 650 that has received the imaging process execution signal executes an imaging process, and transmits captured image data obtained by the imaging process to the acquisition unit 1140 of the third control device 1100. After transmitting the operation start signal to the suction mechanism 820, the control unit 1110 controls the operation sequence of the suction mechanism 820, the third robot arm 600, and the alternate robot hand 610 using the operation completion signal each transmitted from the suction mechanism 820, the third robot arm 600, and the alternate robot hand 610 via the acquisition unit 1140.

The calculation unit 1120 of the third control device 1100 may be, for example, an arithmetic device of a central processing unit of a computer, and may generate data necessary for generating control signals from data stored in the memory unit 1130 and data transmitted from the acquisition unit 1140, and then supplies that data to the control unit 1110. For example, the calculation unit 1120 may calculate a distance between the marker (or markers) of the movable finger 621 and the marker of the fixed finger 622 of the alternate robot hand 610 from the imaging data transmitted from the imaging device 650 via the acquisition unit 1140, and then determine or estimate a thickness of the bill bundle MT held by the robot hand 610 from the calculated distance.

Additionally, the calculation unit 1120 integrates (e.g., sums) the thickness of multiple bill bundles MT for each iteration of moving a bill bundle MT to the bill storage case 10, and determines whether the integrated value exceeds a first threshold value and whether the integrated value exceeds a third threshold value (i.e., a threshold value larger than the first threshold value). Here, the first threshold indicates a prospect of the thickness of the bill bundle MT before the robot hand 610 becomes difficult to enter the bill storage case 10 through the opening OP, and the third threshold indicates a prospect of the thickness of the bill bundle MT that can be accommodated in the bill storage case 10. When the calculation unit 1120 determines that the integrated value exceeds the first threshold, the calculation unit 1120 transmits to the control unit 1110 a signal indicating an instruction for transmitting an operation start signal (hereinafter referred to as an "operation start signal transmission instruction signal") to the suction mechanism 820. The control unit 1110 that has received the operation start signal transmission instruction signal from the suction mechanism 820 transmits an operation start signal to the suction mechanism 820. Subsequently, after detaching the front wall unit 12 from the bill storage case 10, the suction mechanism 820 attaches the front wall unit 12 to the partial box unit 11 (described later) and then stops its operation. Upon determining that the integrated value exceeds the third threshold, the calculation unit 1120 transmits, to the control unit 1110, an operation start signal transmission command signal for the rotation power mechanism 860 and resets the integrated value to "0". The control unit 1110 that has received the operation start signal transmission instruction signal for the rotation power mechanism 865 transmits an operation start signal to the rotation power mechanism 860. The rotation power mechanism 860 then rotates the circular table 811 by half. Subsequently, when the thickness of the bill bundle MT is measured again, the calculation unit 1120 integrates the thickness of the bill bundle MT again, and the above-described processing is repeated.

Additionally, the calculation unit 1120 determines whether the integrated value exceeds a second threshold value (a threshold value larger than the first threshold value and smaller than the third threshold value) every time a thickness of the bill bundle MT is integrated. The second threshold indicates a prospect of the thickness of the bill bundle MT for which it is substantially impossible for the alternate robot hand 610 to enter the bill storage case 10 through the opening OP. When determining that the integrated value exceeds the second threshold, the calculation unit 1120 transmits, to the control unit 1110, a signal indicating an instruction for transmitting an operation change signal to the third robot arm 600 (hereinafter referred to as the an "operation change signal transmission instruction signal"). The control unit 1110 that has received the operation change signal transmission instruction signal for the third robot arm 600 transmits the operation change signal to the third robot arm 600. Then, the third robot arm 600 switches its operation from "an operation of making the alternate robot hand 610 (i.e., the bill bundle MT) enter the interior of the bill storage case 10 through the opening OP" to "an operation of making the alternate robot hand 610 (i.e., the bill bundle MT) enter the interior of the bill storage case 10 through the opening on the front side of the partial box unit 11 (i.e., the opening on the side where the front wall unit 12 existed)".

Further, when determining that the integrated value exceeds the third threshold, the calculation unit 1120 transmits an operation start signal transmission instruction signal for the rotation power mechanism 860 to the control unit 1110, and resets the integrated value to 0. The control unit 1110 that has received the operation start signal transmission instruction signal for the rotation power mechanism 860 transmits an operation start signal to the rotation power mechanism 860. This causes the rotation power mechanism 860 to rotate the circular table 811 by half. Subsequently, when a thickness of the bill bundle MT is measured again, the calculation unit 1120 integrates the thickness of the bill bundle MT again, and the above-described processing is repeated.

Various advantages may occur by such an integration process. When the calculation unit 1120 determines that the integrated value of the thickness of the bill bundle MT exceeds the first threshold, the front wall unit 12 is removed from the bill storage case 10 by the suction mechanism 820, and the partial box unit 11 is packed with the paper sheet bundle MT by the first robot arm 200 with a robot hand. Thus, in the case storage mechanism 800, when the bill bundle MT is boxed by the third robot arm 600 with the alternate robot hand 610, as much space of the bill storage case 10 as possible may be used for accommodating the bill bundle MT. Also, when the calculation unit 1120 determines that the integrated value of the thickness of the paper sheet bundle MT exceeds the first threshold value, the suction mechanism 820 starts the front wall unit attaching/detaching operation. Thus, in the case storage mechanism 800, while the amount or size of the bill bundle MT to be boxed into the bill storage case 10 is small and the space in which the robot hand 610 can be inserted into the bill storage case 10 is sufficient, the detaching operation of the front wall unit 12 by the suction mechanism 820 and a reconfiguration operation of the bill storage case 10 can be omitted.

When the calculation unit 1120 determines that the integrated value of the bill bundle MT exceeds the second threshold value, the third robot arm 600 with alternate robot hand 610 can pack the bill bundle MT from the opening on the side of the detached front wall unit 12. This allows the case storage mechanism 800 to compress the bill bundle MT every time the bill bundle MT is packed in the partial box unit 11, and can so increase a filling ratio of the bill bundle MT in the bill storage case 10.

When the calculation unit 1120 determines that the integrated value of the thickness of the bill bundle MT exceeds the third threshold, the rotation power mechanism 860 rotates the circular table 8110 by half. Thus, with the case storage mechanism 800, an operator can safely collect a filled bill storage case 10 at a position away from the third robot arm 600.

In additional and/or alternative variations, the measurement of the thickness of the bill bundle MT may be performed by other components, such as the second robot arm 300 as it removes the bill bundle MT from the bill storage container 400. The thickness of the bill bundle may be determined or estimated using a pressure sensor disposed in the alternate robot hand 610.

While the case storage mechanism 800 is illustrated with a configuration for mounting two bill storage cases 10, one skilled in the art will recognize that it may be configured for mounting more than two. For example, it could be configured to hold three bill storage cases 10 oriented 120 degrees away from each other, or four bill storage cases 10 positioned at right angles to each other. When N bill storage cases 10 are arranged on the circular table 811 in the above-described manner, the rotation power mechanism 860 rotates the circular table 811 by 360/N (degree) when switching between which bill storage case 10 is being packed.

In another embodiment of the case storage mechanism 800, the third robot arm 600, the alternate robot hand 610, and the suction mechanism 820 each transmit an operation completion signal to the third control device 1100, and the control unit 1110 transmits a new operation start signal to the third robot arm 600, the alternate robot hand 610, and the suction mechanism 820 after receiving an operation completion signal, thereby controlling (interlock controlling) the operation order of the third robot arm 600, the alternate robot hand 610, and the suction mechanism 820; alternatively, the operations of the third robot arm 600, the alternate robot hand 610, and the suction mechanism 820 may be timing-controlled (may be subjected to time management control) during a period from a time of detaching the front wall unit 12 by the suction mechanism 820 to a time of reconstructing the bill storage case 10.

In another embodiment of the case storage mechanism 800, the bill bundle MT is inserted from the opening OP on the top surface side until the calculation unit 1120 determines that the integrated value of the thickness of the bill bundle MT exceeds the second threshold, and the sheet bundle MT is inserted into the bill storage case 10 from the opening on the front surface side of the partial box unit 11 (i.e., the opening on the side where the front wall unit 12 existed) after the calculation unit 1120 determines that the integrated value of the thickness of the bill bundle MT exceeds the first threshold; alternatively, the paper sheet bundle MT may be inserted into the bill storage case 10 from the opening on the front surface side of the partial box unit 11 at a timing when the calculation unit 1120 determines that the integrated value of the thickness of the paper sheet bundle MT exceeds the first threshold. In such a case, the second threshold is unnecessary.

In further embodiments of the case storage mechanism 800, although a circular table 811 is described above as the table of the turntable 850, the shape of the table need not be so limited, and a table of an arbitrary shape may be used. Although the turntable 850 described above is automatically-controlled, a manually-controlled turntable may be used. Although the suction mechanism 820 such as the vacuum chuck mechanism is employed as a means for chucking the front wall unit 12 of the bill storage case 10, another grasping mechanism may be employed as a means for chucking the front wall unit 12 of the bill storage case 10. In this case, it is assumed that the alternate grasping mechanism can lift the front wall unit 12 while releasing the locked state of the bill storage case 10. Although a ball lock type lock mechanism is described as the lock mechanisms Lr and Ll, another lock mechanism may be employed. However, in this case, it is assumed that the suction mechanism 820 can lift the front wall unit 12 while releasing the locked state.

Described now are various further embodiments for the robot hand 302 and/or the alternate robot hand 610 as previously described. Note again that although the bill bundle MT is shown as the object to be grasped by the robot hand 302 in the above embodiment, the object to be grasped by the robot hand 302 and/or the alternate robot hand 610 may be another paper sheet, an object, or the like.

In a one variation, the tip of the fixed finger 320 is positioned in the forward direction of Dy, in front of the tip of the movable finger 310, but this relationship may be reversed. That is, the tip end of the movable finger 310 may be positioned in the forward direction of Dy, in front of the tip end of the fixed finger 320. In this case, the robot hand 302 may be inverted by the third robot arm 600 when grasping the bill bundle MT.

In another variation, of the configuration of FIG. 5C in which the rubber sheet Sr of the movable finger 310 does not face the rubber sheet Sr of the fixed finger 320, instead the rubber sheet Sr may be attached to the inside of the claw portion 313 of the movable finger 310 and the inside of the protruding portion 324 of the fixed finger 320 such that the rubber sheet Sr of the movable finger 310 faces the rubber sheet Sr of the fixed finger 320. In this case, the portion to which the rubber sheet Sr has been attached in the fixed finger 320 is extended to the rear of the tip position Tm of the movable finger 310.

In another variation of the configuration of FIG. 5C, in which the rubber sheet Sr is attached to both the claw portion 313 of the movable finger 310 and the protruding portion 324 of the fixed finger 320, instead, the rubber sheet Sr may be attached to only one of the movable finger 310 and the fixed finger 320.

In another variation of the configuration of FIG. 5C, in which the rubber sheet Sr is attached to the inside of the claw portion 313 of the movable finger 310 and the inside of the protruding portion 324 of the fixed finger 320 as a slip prevention material, instead the inside surface of one or both of the same portions may be subjected to roughening treatment or the like. Note that this fourth modification may be applied to the second and third variations just described.

In another variation of the configuration of FIG. 5C, in which the fixed finger 320 is fixed and only the movable finger 310 is movable, instead the fixed finger 320 may also be movable in the same manner as the movable finger 310.

In another variation of the configuration of FIG. 5C, in which the air cylinder mechanism is employed as the movable finger lifting mechanism 330, instead, other known lifting mechanisms such as a rack and pinion mechanism, a ball screw mechanism, a motor cylinder mechanism, an electric slider mechanism, a belt slider mechanism, and a linear slider mechanism may be employed as the movable finger lifting mechanism 330. In such a case, an electric motor may be employed as a driving source.

In any of the embodiments of the robot hand 302, the control device may analyze the front image of the bill storage container 400 captured by the second robot arm imaging unit 350 to determine the position of the notch Rs of the holding plate 411 and the position of the slit Rt between the support bases 412a and 412b, control the robot arm 200 and the robot hand 302 to adjust the position of the movable finger 310, insert the tip portion of the movable finger 310 into the notch Rs of the holding plate 411, and insert the tip portion of the fixed finger 320 into the slit Rt between the support bases 412a and 412b.

FIGS. 16A-16K show embodiments with additional and/or alternative configurations for fixed finger(s) and movable finger(s) of the robot hand 302.

Figure 16A:
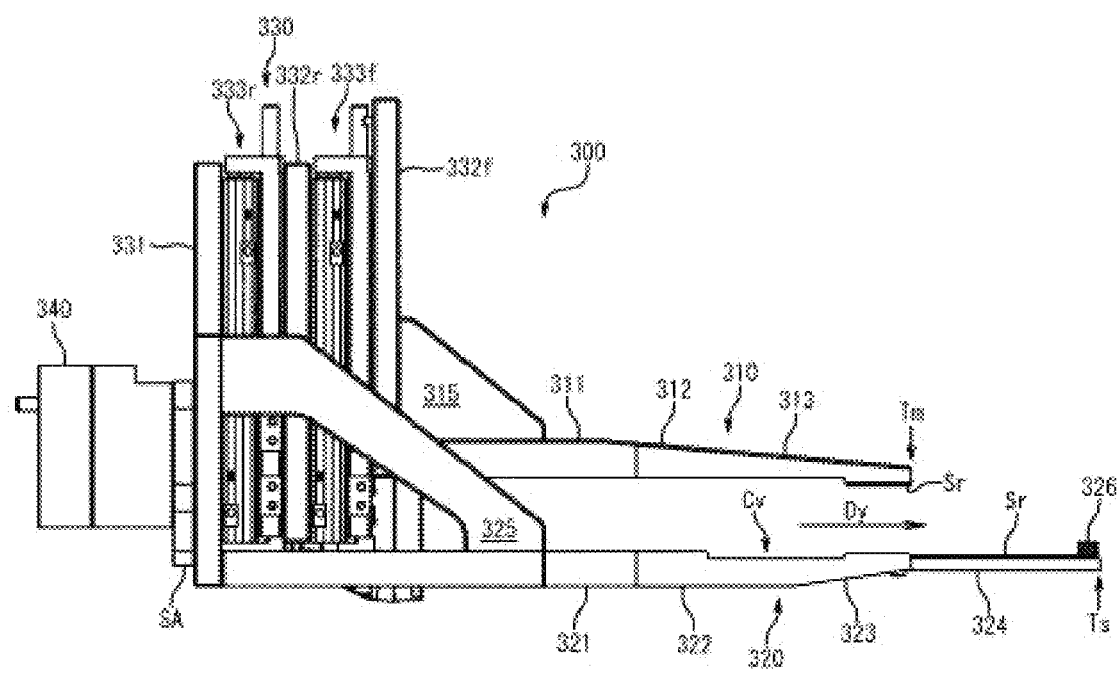
FIGS. 16A-16K show side views of alternative configurations of fingers of a robot hand.

FIG. 16A shows a variant embodiment of the robot hand 302 in which a protruding portion 326 protruding upward may be provided at the tip portion of the protruding portion 324 of the fixed finger 320. The protruding portion 326 provided in such a manner allows the bill bundle MT to be hooked by the protruding portion 326 and to be pulled out the bill bundle MT in front of the bill storage container 400. In this embodiment, in the movable finger 310, the upper surface is inclined downward from the base end of the intermediate portion 312 to the tip of the claw portion 313 in the region from the base end of the intermediate portion 312 to the tip of the claw portion 313.

Figure 16B:
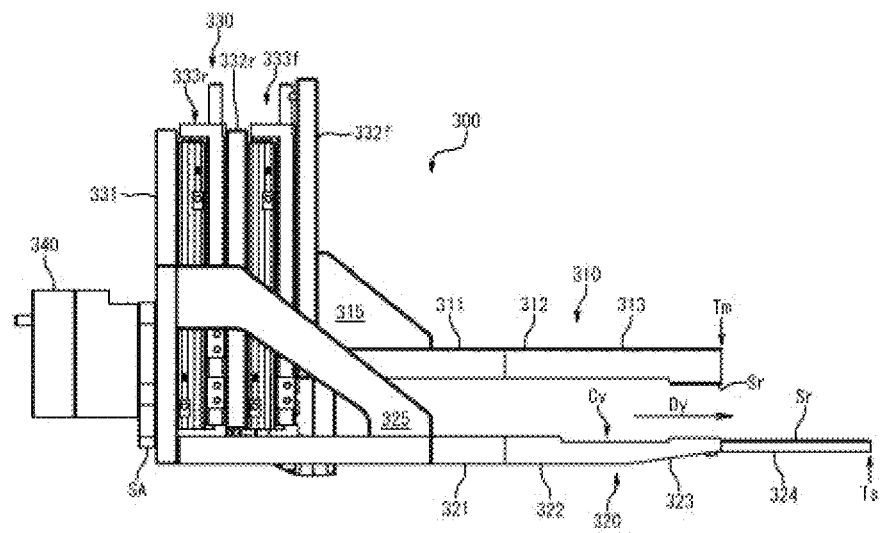

FIG. 16B shows a variant embodiment of the robot hand 302 shown in FIG. 16A. In the embodiment of FIG. 16B the upper surface of the intermediate portion 312 may be a horizontal surface on the same plane as the upper surface of the base portion 311. Forming the claw portion 313 of the movable finger 310 in such a shape allows for increasing the rigidity of the claw portion 313 of the movable finger 310. The lower surface of the fixed finger 320 is inclined upward from the intermediate position of the claw portion 323 toward the tip of the claw portion 323 in the region from the intermediate position of the claw portion 323 to the tip of the claw portion 323.

Figure 16C:
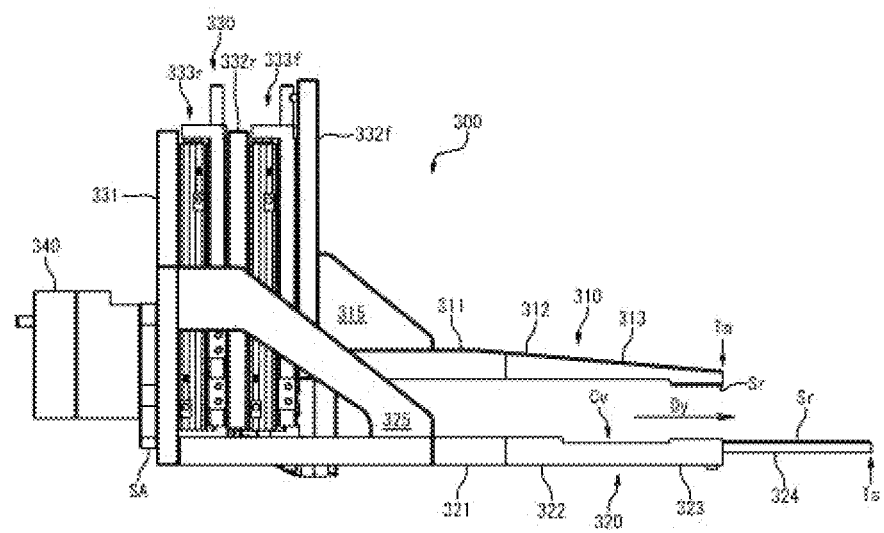

FIG. 16C shows a variant embodiment of the robot hand 302 shown in FIG. 16A. In this embodiment, the lower surface of the claw portion 323 may be a horizontal surface on the same plane as the lower surface of the base portion 321. Forming the claw portion 323 of the fixed finger 320 in such a shape allows for increasing the rigidity of the claw portion 323 of the fixed finger 320. This variant embodiment may be used together with the variant embodiment shown in FIG. 16B. The protruding portion 324 of the fixed finger 320 is, in this variant, an elongated substantially rectangular thick plate portion having the same width as the width of the claw portion 323.

Figure 16D:
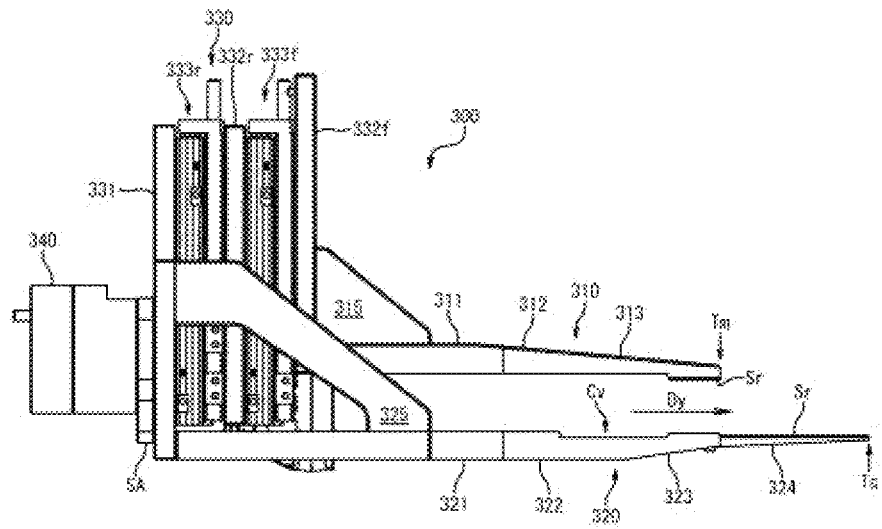

FIG. 16D shows a variant embodiment of the robot hand 302 shown in FIG. 16A. In this embodiment, the protruding portion 324 may have a shape in which the lower surface of the protruding portion 324 is inclined upward from the base end of the protruding portion toward the tip of the protruding portion 324. Forming the protruding portion 324 of the fixed finger 320 in such a shape provides an alternative for inserting the fixed finger 320 into the bill storage container 400. In this variant, the notch Cv is provided in the claw portion 323 of the fixed finger 320.

Figure 16E:
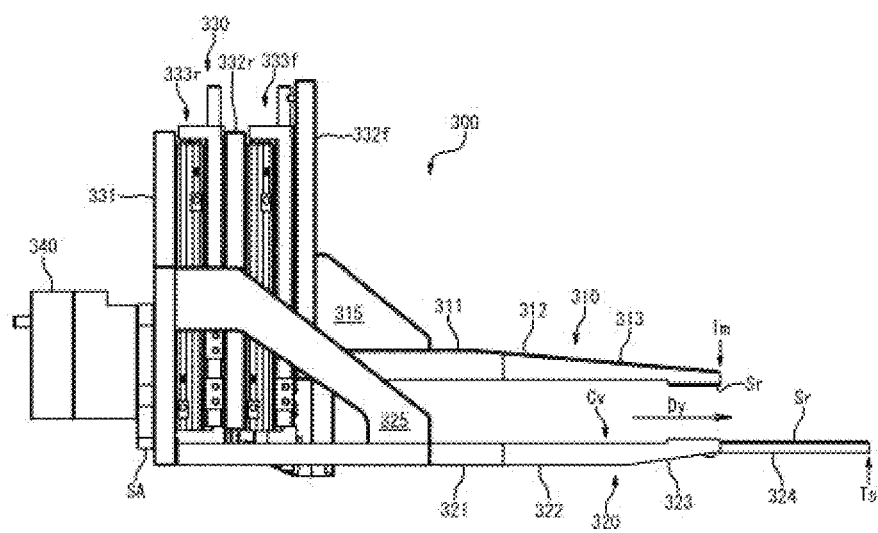

FIG. 16E shows a variant embodiment of the robot hand 302 shown in FIG. 16A. In this embodiment, the notch Cv may extend to the base end of the base portion 321. Extending the notch Cv in this manner provides rigidity of the fixed finger 320 and widens the contact area with respect to the bill bundle MT. In the robot hand 302 according to this variant embodiment, the tip portion of the claw portion 313 of the movable finger 310 protrudes downward, and the tip portion of the claw portion 323 of the fixed finger 320 protrudes upward.

Figure 16F:
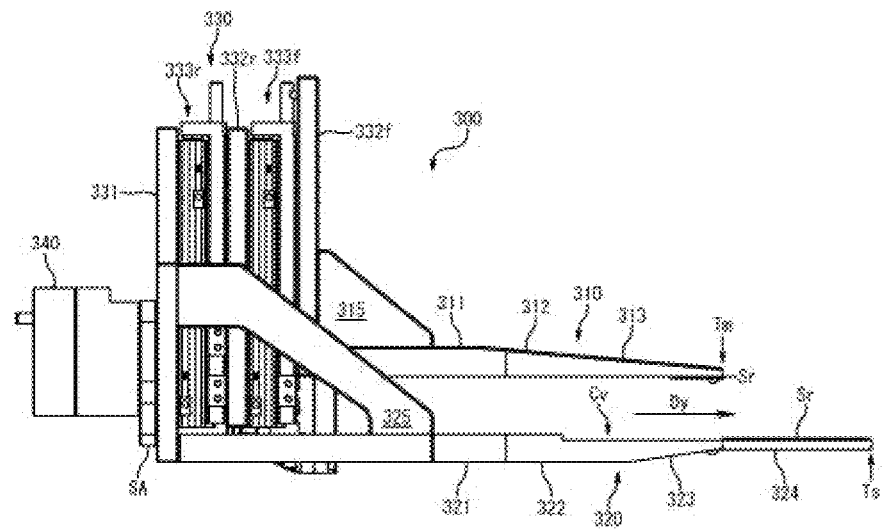
Figure 16G:
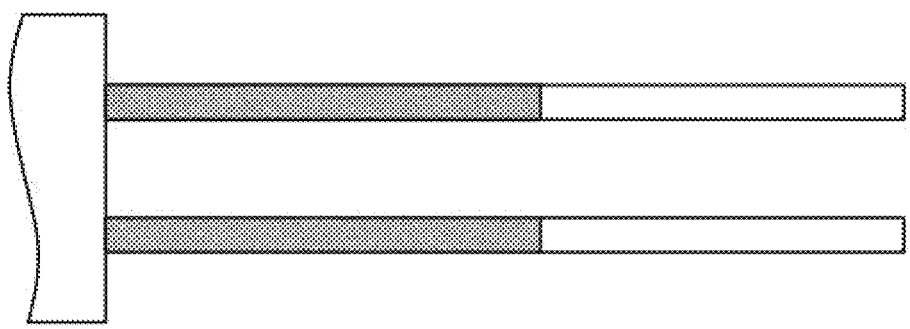
Figure 16H:
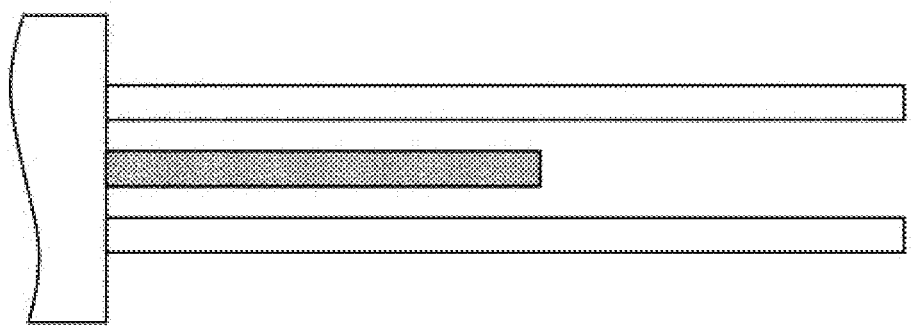
Figure 16I:
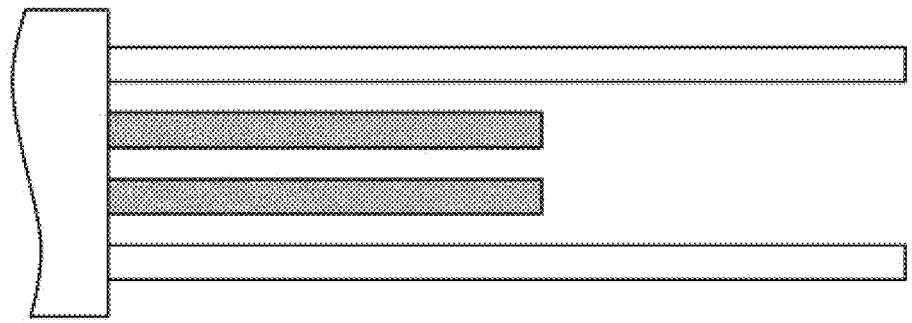
Figure 16J:
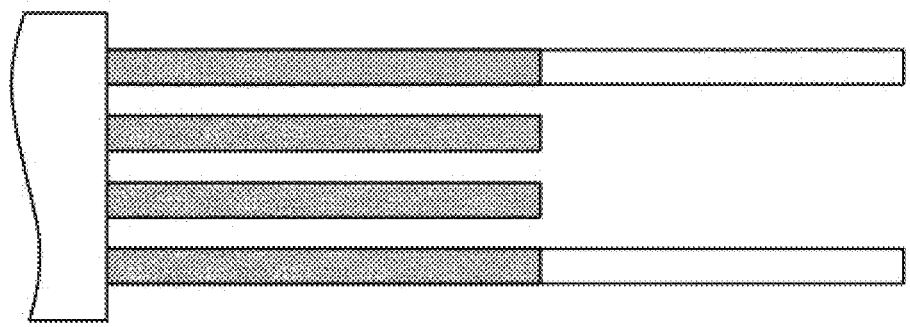
Figure 16K:
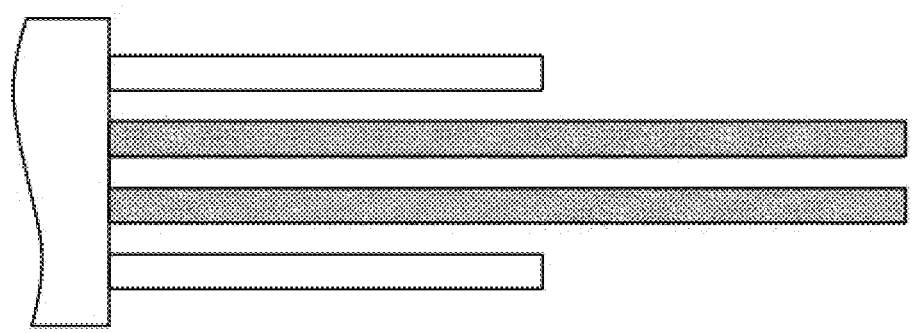

FIG. 16F shows a variant embodiment of the robot hand 302 shown in FIG. 16A. In this embodiment, the lower surface of the claw portion 313 of the movable finger 310 may be a flat surface, and the upper surface of the tip portion of the claw portion 323 of the fixed finger 320 may be a flat surface.

In the variant embodiments of the robot hand 302 shown in FIGS. 5B, 11, and 16A-16F, each of the movable finger 310 and the fixed finger 320 is composed of one rod-shaped member. In the variant embodiments shown in FIGS. 16G-16K, either or both of the movable finger and the fixed finger may be composed of two rod-shaped members. In this embodiment, the contact area of the movable finger and the fixed finger with respect to the bill bundle MT can be widened, thereby enhancing a probability of firmly grasping the bill bundle MT by the movable finger and the fixed finger. Note that in FIGS. 16G-16K, the hatched portion indicates the movable finger, and the portion of the hatched portion plus the non-hatched portion indicates the fixed finger; alternatively, the portion of the hatched portion plus the non-hatched portion may be the movable finger and the hatched portion may be the fixed finger. In the latter case, the first variation described above may be used.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An automatic bill handling system, comprising:
   a box conveying device configured to convey a bill storage container in which bills are stored;
   a first robot arm configured to unlock the bill storage container using a key and open a lid of the bill storage container;
   a second robot arm configured to extract bills stored in the bill storage container;
   a bill conveying device configured to convey the bills extracted by the second robot arm;
   a bill storage case configured to accumulate the bills extracted from the bill storage container; and
   a third robot arm configured to grasp bills conveyed by the bill conveying device and accumulate the bills in the bill storage case.

2. The automatic bill handling system of claim 1, further comprising:
   a printer configured to print a sheet for identifying the bills of the bill storage container; and
   a fourth robot arm configured to place the sheet on the bills after the bills have been conveyed by the bill conveying device; wherein:
   the third robot arm is operable to grasp the bills with the sheet and accumulate the bills with the sheet in the bill storage case.

3. The automatic bill handling system of claim 2, further comprising an arranging mechanism configured to arrange bills on the bill conveying device, wherein the fourth robot arm places the sheet on the bills that have been arranged.

4. The automatic bill handling system of claim 2, further comprising:
   an imaging device configured to measure a thickness of the bills grasped by the third robot arm;
   a control device configured to calculate a thickness of the bills accumulated in the bill storage case based on image data obtained by the imaging device; and
   a case storage mechanism configured to replace the bill storage case with another bill storage case when the thickness of the bills accumulated in the bill storage case exceeds a predetermined amount.

5. The automatic bill handling system of claim 1, further comprising a box image sensor configured to determine a type of the bill storage container, the box image sensor being provided in a vicinity of the box conveying device, wherein:
   the first robot arm is operable to:
      identify a key type for the bill storage container based on the determined type of the bill storage container; and
      unlock the bill storage container using the identified key type for the bill storage container.

6. The automatic bill handling system of claim 5, wherein:
   the box image sensor is operable to identify a position and/or an inclination of a key hole of the bill storage container based on the determined type of the bill storage container.

7. An automatic bill handling method comprising:
   unlocking a bill storage container using a key with a first robot arm;
   opening a lid of the unlocked bill storage container with the first robot arm;
   extracting, using a second robot arm, bills stored in the bill storage container in a posture in which the lid of the bill storage container has been opened;
   conveying the extracted bills by a bill conveying device;
   grasping the bills conveyed by the bill conveying device with a third robot arm; and
   accumulating the bills in a bill storage case.

* * * * *